(12) United States Patent
Gao

(10) Patent No.: US 12,133,234 B2
(45) Date of Patent: Oct. 29, 2024

(54) UPLINK CHANNEL TRANSMISSION METHOD, TERMINAL, AND BASE STATION

(71) Applicant: DATANG MOBILE COMMUNICATIONS EQUIPMENT CO., LTD., Beijing (CN)

(72) Inventor: Xuejuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 334 days.

(21) Appl. No.: 17/608,051

(22) PCT Filed: Apr. 24, 2020

(86) PCT No.: PCT/CN2020/086733
§ 371 (c)(1),
(2) Date: Nov. 1, 2021

(87) PCT Pub. No.: WO2020/221131
PCT Pub. Date: Nov. 5, 2020

(65) Prior Publication Data
US 2022/0240295 A1 Jul. 28, 2022

(30) Foreign Application Priority Data

Apr. 30, 2019 (CN) .......................... 201910365498.4

(51) Int. Cl.
*H04W 72/23* (2023.01)
*H04L 5/00* (2006.01)

(52) U.S. Cl.
CPC ........... *H04W 72/23* (2023.01); *H04L 5/0048* (2013.01); *H04L 5/0055* (2013.01); *H04L 5/0094* (2013.01)

(58) Field of Classification Search
CPC ... H04L 5/0048; H04L 5/0055; H04L 5/0094; H04L 1/0027; H04L 1/1864;
(Continued)

(56) References Cited

U.S. PATENT DOCUMENTS

2018/0279298 A1* 9/2018 Wang ..................... H04L 1/0026
2018/0368138 A1* 12/2018 Jung ..................... H04L 1/1812
(Continued)

FOREIGN PATENT DOCUMENTS

CN 108521885 A 9/2018
CN 109155726 A 1/2019
(Continued)

OTHER PUBLICATIONS

Chinese Office Action dated Mar. 29, 2021 for CN Application No. 201910365498.4.
(Continued)

*Primary Examiner* — Benjamin H Elliott, IV
(74) *Attorney, Agent, or Firm* — Harness, Dickey & Pierce, P.L.C.

(57) ABSTRACT

A method, a terminal, and a base station. The method includes: when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determining the time value according to parameter values corresponding to each of the plurality of channels or according to parameter values corresponding to part of the plurality of channels or according to part of parameter values corresponding to the plurality of channels, wherein the parameter values are used to determine the time value; performing a timeline condition adjustment for a first symbol of an earliest channel among the overlapped PUCCH and PUSCH or the plurality of overlapped PUCCHs based on the time value.

12 Claims, 5 Drawing Sheets

(58) Field of Classification Search
CPC ... H04L 1/1887; H04L 1/0026; H04L 1/1854; H04L 1/1896; H04L 5/0053; H04L 5/0096; H04L 5/0044; H04W 72/23; H04W 72/0446
See application file for complete search history.

(56) References Cited

U.S. PATENT DOCUMENTS

| | | | | |
|---|---|---|---|---|
| 2019/0261391 | A1* | 8/2019 | Kundu | H04L 1/0073 |
| 2020/0403735 | A1* | 12/2020 | Zhao | H04L 1/1896 |
| 2021/0058948 | A1* | 2/2021 | Zhao | H04W 72/1268 |
| 2021/0185682 | A1* | 6/2021 | Lee | H04L 1/1819 |
| 2022/0078814 | A1* | 3/2022 | Jung | H04L 5/003 |

FOREIGN PATENT DOCUMENTS

| | | |
|---|---|---|
| TW | 201841486 A | 11/2018 |
| WO | WO-2018/143731 A1 | 8/2018 |

OTHER PUBLICATIONS

Qualcomm Incorporated, "UE Processing Time and UCI Multiplexing TPs for 38.213 and 38.214", 3GPP TSG-RAN WG1 Meeting #94, R1-1809953, Aug. 20-24, 2018, Gothenburg, Sweden.
ZTE, "Remaining issues for multiplexing UCI on PUSCH", Agenda item 7.1.3.2.3, 3GPP TSG RAN WG1 Meeting #93, R1-1806133, May 21, 25, 2018, Busan, Korea.
Intel Corporation, "PUSCH-PUCCH and PUCCH-PUCCH collision handling", 3GPP TSG RAN WG1 Meeting #93, R1-1806520, May 21-25, 2018, Busan Korea.
International Search Reporting and Written Opinion mailed Jul. 15, 2020 for International Application No. PCT/CN2020/086733.
Taiwanese Office Action dated Feb. 17, 2021 for Application No. 109114007.
Extended European Search Report dated Jun. 1, 2022 for Application No. EP 20798254.7.
Huawei, Hisilicon, "Summary of remaining issues on NR CA", Agenda item 7.1.3.4.2, 3GPP TSG RAN WG1 Meeting #92, R1-1801348, Feb. 26-Mar. 2, 2018, Athens, Greece.
Sony, "Remaining issues in explicit uplink HARQ-ACK feedback for efeMTC", Agenda item 6.2.6.5, 3GPP TSG RAN WG1 Meeting #92bis, R1-1804605, Apr. 16-20, 2018, Sanya, China.
Oppo, "Discussions on intra-UE multiplexing scenarios", Agenda item 7.2.6.4, 3GPP TSG RAN WG1 #96, R1-1902422, Feb. 25-Mar. 1, 2019, Athens, Greece.
Japanese Office Acton for Japanese Patent Application No. 2021-564844 drafted Oct. 11, 2022.
Institute for Information Industry (III), Enhancements to HARQ for eURLLC, Agenda item 7.2.6.4, 3GPP TSG RAN WG1 #96bis, R1-1905105, Apr. 8-12, 2019, Xi'an, China.
Nokia, Nokia Shanghai Bell, On UCI Enhancements for NR URLLC, Agenda item 7.2.6.2, 3GPP TSG RAN Wg1#96bis, R1-1904828, Apr. 8-12, 2019, Xi'an, China.
Request for the submission of an Opinion issued Apr. 9, 2024 in Korean Application No. 10-2021-07039022.
3GPP, TS38.213 v15.5.0, NR, physical layer procedures for control, Mar. 28, 2019.
3GPP, TS38.214 v15.5.0, NR, physical layer procedures for data, Mar. 26, 2019.

\* cited by examiner

11 — when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determining the time value according to parameter values corresponding to each of the plurality of channels or according to parameter values corresponding to part of the plurality of channels or according to part of parameter values corresponding to the plurality of channels, wherein the parameter values are used to determine a time value 12 — performing a timeline condition adjustment for a first symbol of an earliest channel among the overlapped PUCCH and PUSCH or among the plurality of overlapped PUCCHs based on the time value

FIG. 1

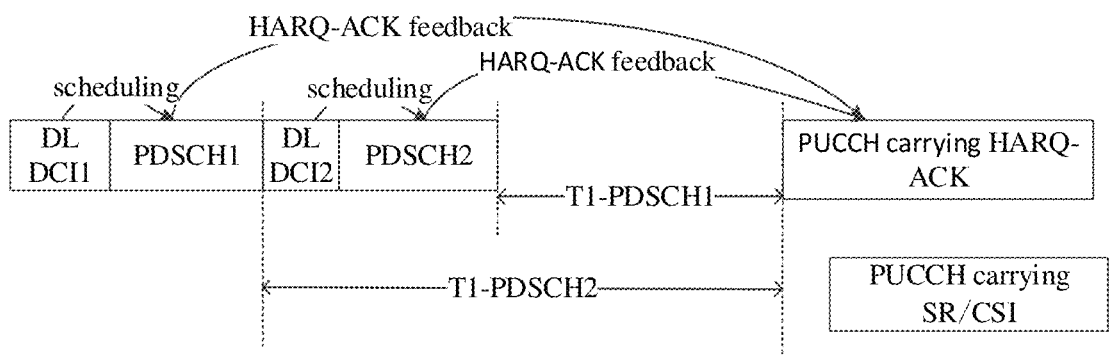

FIG. 2

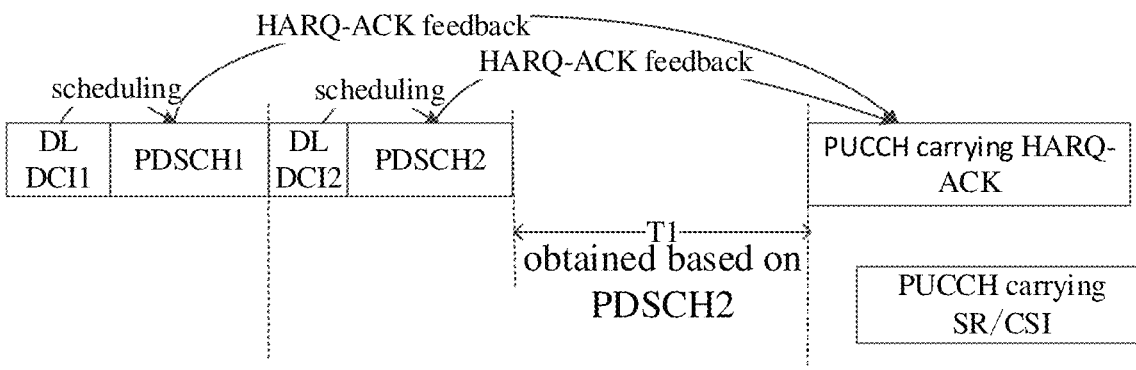

FIG. 3

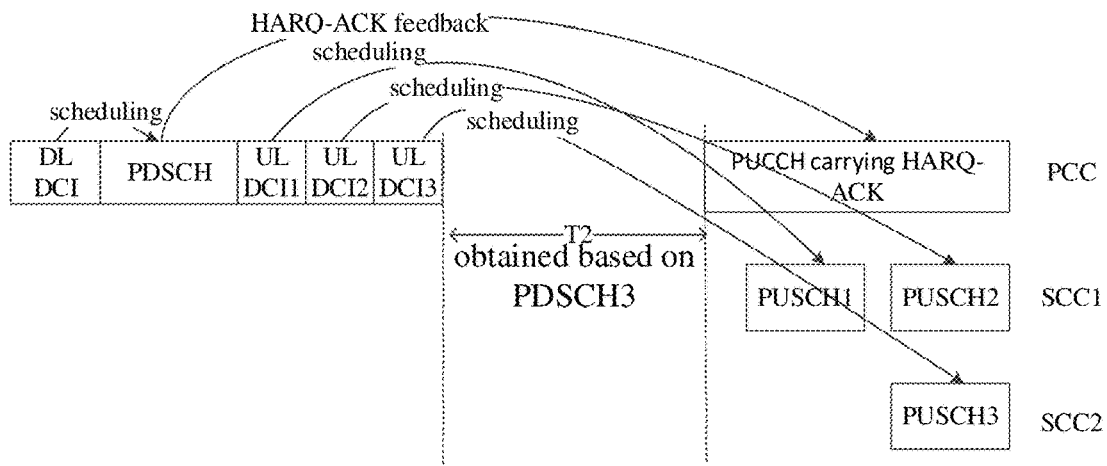

FIG. 7

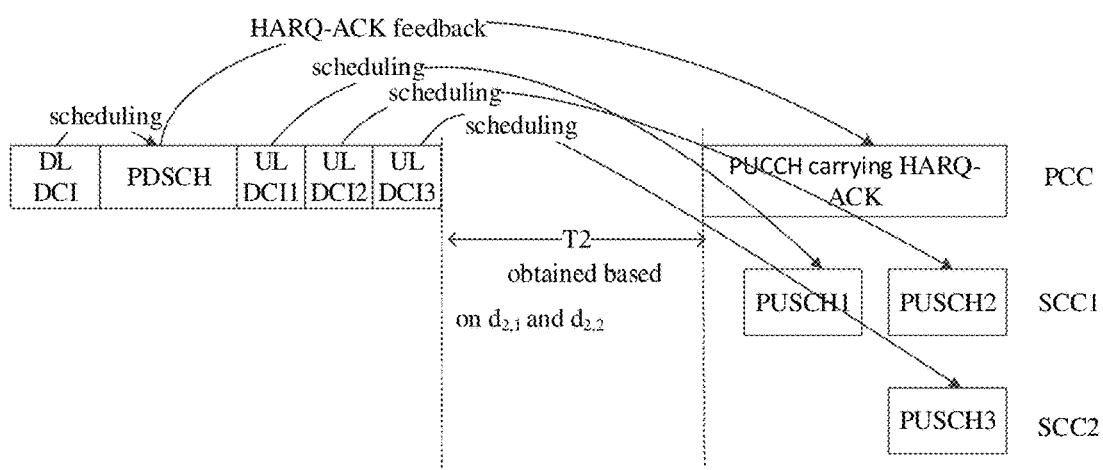

FIG. 8 when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determining the time value according to parameter values corresponding to each of the plurality of channels or according to parameter values corresponding to part of the plurality of channels or according to part of parameter values corresponding to the plurality of channels, wherein the parameter values are used to determine the time value ⟋91 sending downlink transmission to the terminal, wherein a time condition determined based on the time value is met between the downlink transmission and a first symbol of an earliest channel among the overlapped PUCCH and PUSCH or the overlapped PUCCHs ⟋92

FIG. 9

UPLINK CHANNEL TRANSMISSION METHOD, TERMINAL, AND BASE STATION

CROSS-REFERENCE TO RELATED APPLICATIONS

This application is the U.S. national phase of PCT Application No. PCT/CN2020/086733 filed on Apr. 24, 2020, which claims priorities of the Chinese patent application No. 201910365498.4 filed on Apr. 30, 2019, which is incorporated herein by reference in its entirety.

TECHNICAL FIELD

The present disclosure relates to the field of communications technology, in particular to an uplink channel transmission method, a terminal and a base station.

BACKGROUND

In the 5G New Radio (NR) system, when t there are overlapped physical uplink control channel (PUCCH) and physical uplink shared channel (PUSCH), or there are overlapped PUCCHs, a time condition is determined for the overlapped channels, and when the time condition is met, uplink control information (UCI) is multiplexed on the PUSCH or on a certain PUCCH for transmission, thereby avoiding the parallel transmission of a plurality of uplink channels.

At this time, if there are a plurality of physical downlink shared channels (PDSCH) that require Hybrid Automatic Repeat request Acknowledgements (HARQ-ACKS) feedback in PUCCH, the transmission parameters of the plurality of PDSCHs may be different. The processing delays corresponding to different PDSCHs are different. At this time, there is no clear way to define the time conditions related to PDSCH; if there are a plurality of PUSCHs and PUCCHs overlapping with to each other, and the transmission parameters of the plurality of PUSCHs may be different, the processing delays corresponding to different PUSCHs may be different. At this time, there is no clear method on how to define the time condition related to PUSCH.

SUMMARY

An object of the present disclosure is to provide an uplink channel transmission method, a terminal and a base station, thereby solving the problem that when there are overlapped PUCCH and PUSCH or overlapped PUCCHs in the 5G NR system, the time value used to determine the time condition cannot be determined.

An embodiment of the present disclosure provides an uplink channel transmission method, applied to a terminal, includes: when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determining the time value according to parameter values corresponding to each of the plurality of channels or according to parameter values corresponding to part of the plurality of channels or according to part of parameter values corresponding to the plurality of channels, wherein the parameter values are used to determine a time value; performing a timeline condition adjustment for a first symbol of an earliest channel among the overlapped PUCCH and PUSCH or the plurality of overlapped PUCCHs based on the time value.

Optionally, if there are a plurality of channels corresponding to parameter values, or if there are the plurality of channel corresponding to parameter values and the parameter values corresponding to the plurality of channels are different, determining the time value according to a parameter value corresponding to each of the plurality of channels or according to parameter values corresponding to part of the plurality of channels or according to part of parameter values corresponding to the plurality of channels includes: if there are a plurality of downlink channels for which hybrid automatic repeat request acknowledges (HARQ-ACKS) needs to be transmitted on a same PUCCH, or if there are a plurality of downlink channels for which the HARQ-ACKS needs to be transmitted on the same PUCCH and the first set of parameter values corresponding to the plurality of downlink channels are different, determining the first time value according to the first set of parameter values corresponding to each of the plurality of downlink channels or according to the first set of parameter values corresponding to part of the plurality of downlink channels or according to part of the first set of parameter values corresponding to the plurality of downlink channels; wherein, the downlink channel is a physical downlink shared channel (PDSCH) and/or a semi-persistent scheduling SPS PDSCH release; when the downlink channel is the PDSCH, the first set of parameter values include a first parameter value and/or a second parameter value and/or a third parameter value, and the first parameter value is determined according to a mapping type and/or a transmission duration of the PDSCH, the second parameter value is determined according to whether Downlink Control Information (DCI) scheduling the PDSCH indicates a bandwidth part (BWP) switching, and the third parameter value is determined according to a processing capability of the terminal and a reference subcarrier spacing; when the downlink channel is the SPS PDSCH release, the first set of parameter values include a fourth parameter value, and the fourth parameter value is determined according to a subcarrier spacing of the PDCCH that provides the SPS PDSCH release and the processing capability of the terminal.

Optionally, the determining the first time value according to the first set of parameter values corresponding to each of the plurality of downlink channels includes: determining the first time value corresponding to each downlink channel according to the first set of parameter values corresponding to each downlink channel; the performing a timeline condition adjustment for a first symbol of an earliest channel among the overlapped PUCCH and PUSCH or the plurality of overlapped PUCCHs based on the time value includes: determining that the first symbol is not before a symbol starting after the first time value corresponding to each downlink channel after a last symbol of each downlink channel.

Optionally, determining the first time value according to the first set of parameter values corresponding to part of the plurality of downlink channels includes: determining the first time value according to the first set of parameter values corresponding to a first downlink channel or a last downlink channel among the plurality of downlink channels or a downlink channel that obtains a maximum first time value; wherein the downlink channel that obtains the maximum first time value is a downlink channel corresponding to a maximum first parameter value and/or second parameter value and/or third parameter value.

Optionally, the determining the first time value according to part of the first set of parameter values corresponding to the plurality of downlink channels includes at least one of the following: determining the first time value according to a maximum value of first parameter values corresponding to the plurality of downlink channels; determining the first time value according to a maximum value of second parameter values corresponding to the plurality of downlink channels; determining the first time value according to a maximum value of third parameter values corresponding to the plurality of downlink channels; wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

Optionally, the performing a timeline condition adjustment for a first symbol of an earliest channel among the overlapped PUCCH and PUSCH or the plurality of overlapped PUCCHs based on the time value includes: determining that the first symbol is not before a symbol starting after the first time value after the last symbol of any one of the plurality of downlink channels.

Optionally, if there are a plurality of channels corresponding to parameter values, or if there are the plurality of channel corresponding to parameter values and the parameter values used to determine the time value corresponding to the plurality of channels are different, determining the time value according to a parameter value corresponding to each of the plurality of channels or according to parameter values corresponding to part of the plurality of channels or according to part of parameter values corresponding to the plurality of channels includes: when there are a plurality of PUSCHs overlapping with the PUCCH, or when there are the plurality of PUSCHs overlapping with the PUCCH and a second set of parameter values corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs, wherein the second set of parameter values are used to determine the second time value; wherein the second set of parameter values include a fifth parameter value and/or a sixth parameter value and/or a seventh parameter value; the fifth parameter value is determined based on demodulation reference signal (DMRS) configuration of the PUSCH; the sixth parameter value is determined according to whether the DCI scheduling the PUSCH indicates a BWP switching; the seventh parameter value is determined according to an update set of an aperiodic channel state information (A-CSI) report included in the PUSCH.

Optionally, the determining the second time value according to the second set of parameter values corresponding to each of the plurality of PUSCHs includes: determining the second time value corresponding to each PUSCH according to the second set of parameter values corresponding to each PUSCH; the performing a timeline condition adjustment for a first symbol of an earliest channel among the overlapped PUCCH and PUSCH or the plurality of overlapped PUCCHs based on the time value includes: determining that the first symbol is not before a symbol starting after the second time value after a last symbol of any PDCCH in a first PDCCH set, wherein the first PDCCH set includes the PDCCH for scheduling the PDSCH or SPS PDSCH release that requires HARQ-ACKS feedback on the PUCCH, and the PDCCH for scheduling the PUSCH.

Optionally, the determining the second time value according to the second set of parameter values corresponding to part of the plurality of PUSCHs includes: determining the second time value according to the second set of parameter values corresponding to a first PUSCH or a last PUSCH among the plurality of PUSCHs or a PUSCH that obtains the maximum second time value; wherein the PUSCH that obtains the maximum second time value is a PUSCH corresponding to a maximum fifth parameter value and/or sixth parameter value and/or seventh parameter value.

Optionally, the determining the second time value according to part of second set of the parameter values corresponding to the plurality of PUSCHs includes at least one of the following: determining the second time value according to a maximum value of fifth parameter values respectively corresponding to the plurality of PUSCHs; determining the second time value according to a maximum value of sixth parameter values respectively corresponding to the plurality of PUSCHs; determining the second time value according to a maximum value of seventh parameter values respectively corresponding to the plurality of PUSCHs; wherein the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs.

Optionally, the performing a timeline condition adjustment for a first symbol of an earliest channel among the overlapped PUCCH and PUSCH or the plurality of overlapped PUCCHs based on the time value includes: determining that the first symbol is not before a symbol starting after the second time value after a last symbol of any PDCCH in a first PDCCH set, wherein the first PDCCH set includes a PDCCH for scheduling the PDSCH or SPS PDSCH release that requires HARQ-ACKS feedback on the PUCCH, and the PDCCH for scheduling the PUSCH.

An embodiment of the present disclosure provides an uplink channel transmission method, applied to a base station, includes: when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determining the time value according to parameter values corresponding to each of the plurality of channels or according to parameter values corresponding to part of the plurality of channels or according to part of parameter values corresponding to the plurality of channels, wherein the parameter values are used to determine the time value; and sending downlink transmission to the terminal, wherein a time condition determined based on the time value is met between the downlink transmission and a first symbol of an earliest channel among the overlapped PUCCH and PUSCH or the overlapped PUCCHs.

Optionally, if there are a plurality of channels corresponding to parameter values, or if there are the plurality of channel corresponding to parameter values and the parameter values corresponding to the plurality of channels are different, determining the time value according to a parameter value corresponding to each of the plurality of channels or according to parameter values corresponding to part of the plurality of channels or according to part of parameter values corresponding to the plurality of channels includes: if there are a plurality of downlink channels for which hybrid automatic repeat request acknowledges (HARQ-ACKS)

needs to be transmitted on a same PUCCH, or if there are a plurality of downlink channels for which the HARQ-ACKS needs to be transmitted on the same PUCCH and the first set of parameter values corresponding to the plurality of downlink channels are different, determining the first time value according to the first set of parameter values corresponding to each of the plurality of downlink channels or according to the first set of parameter values corresponding to part of the plurality of downlink channels or according to part of the first set of parameter values corresponding to the plurality of downlink channels; wherein, the downlink channel is a physical downlink shared channel (PDSCH) and/or a semi-persistent scheduling SPS PDSCH release; when the downlink channel is the PDSCH, the first set of parameter values include a first parameter value and/or a second parameter value and/or a third parameter value, and the first parameter value is determined according to a mapping type and/or a transmission duration of the PDSCH, the second parameter value is determined according to whether Downlink Control Information (DCI) scheduling the PDSCH indicates a bandwidth part (BWP) switching, and the third parameter value is determined according to a processing capability of the terminal and a reference subcarrier spacing; when the downlink channel is the SPS PDSCH release, the first set of parameter values include a fourth parameter value, and the fourth parameter value is determined according to a subcarrier spacing of the PDCCH that provides the SPS PDSCH release and the processing capability of the terminal.

Optionally, the determining the first time value according to the first set of parameter values corresponding to each of the plurality of downlink channels includes: determining the first time value corresponding to each downlink channel according to the first set of parameter values corresponding to each downlink channel; the sending downlink transmission to the terminal, wherein a time condition determined based on the time value is met between the downlink transmission and a first symbol of an earliest channel among the overlapped PUCCH and PUSCH or the overlapped PUCCHs includes: sending a plurality of downlink channels to the terminal, wherein the first symbol is no before a symbol starting after the first time value corresponding to each downlink channel after a last symbol of each downlink channel.

Optionally, determining the first time value according to the first set of parameter values corresponding to part of the plurality of downlink channels includes: determining the first time value according to the first set of parameter values corresponding to a first downlink channel or a last downlink channel among the plurality of downlink channels or a downlink channel that obtains a maximum first time value; wherein the downlink channel that obtains the maximum first time value is a downlink channel corresponding to a maximum first parameter value and/or second parameter value and/or third parameter value.

Optionally, the determining the first time value according to part of the first set of parameter values corresponding to the plurality of downlink channels includes at least one of the following: determining the first time value according to a maximum value of first parameter values corresponding to the plurality of downlink channels; determining the first time value according to a maximum value of second parameter values corresponding to the plurality of downlink channels; determining the first time value according to a maximum value of third parameter values corresponding to the plurality of downlink channels; wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

Optionally, the sending downlink transmission to the terminal, wherein a time condition determined based on the time value is met between the downlink transmission and a first symbol of an earliest channel among the overlapped PUCCH and PUSCH or the overlapped PUCCHs includes: sending the plurality of downlink channels to the terminal, wherein the first symbol is not before a symbol starting after the first time value after the last symbol of any one of the plurality of downlink channels.

Optionally, if there are a plurality of channels corresponding to parameter values, or if there are the plurality of channel corresponding to parameter values and the parameter values corresponding to the plurality of channels are different, determining the time value according to a parameter value corresponding to each of the plurality of channels or according to parameter values corresponding to part of the plurality of channels or according to part of parameter values corresponding to the plurality of channels includes: when there are a plurality of PUSCHs overlapping with the PUCCH, or when there are the plurality of PUSCHs overlapping with the PUCCH and a second set of parameter values corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs, wherein the second set of parameter values are used to determine the second time value; wherein the second set of parameter values include a fifth parameter value and/or a sixth parameter value and/or a seventh parameter value; the fifth parameter value is determined based on demodulation reference signal (DMRS) configuration of the PUSCH; the sixth parameter value is determined according to whether the DCI scheduling the PUSCH indicates a BWP switching, the seventh parameter value is determined according to an update set of an aperiodic channel state information (A-CSI) report included in the PUSCH.

Optionally, the determining the second time value according to the second set of parameter values corresponding to each of the plurality of PUSCHs includes: determining the second time value corresponding to each PUSCH according to the second set of parameter values corresponding to each PUSCH; the sending downlink transmission to the terminal, wherein a time condition determined based on the time value is met between the downlink transmission and a first symbol of an earliest channel among the overlapped PUCCH and PUSCH or the overlapped PUCCHs includes: sending each PDCCH in the first PDCCH set to the terminal, wherein the first symbol is not before a symbol starting after the second time value corresponding to each PUSCH after the last symbol of any PDCCH in the first PDCCH set, wherein the first PDCCH set includes the PDCCH for scheduling the PDSCH or SPS PDSCH release that requires HARQ-ACKS feedback on the PUCCH, or a PDCCH for scheduling the PUSCH.

Optionally, the determining the second time value according to the second set of parameter values corresponding to part of the plurality of PUSCHs includes: determining the second time value according to the second set of parameter values corresponding to a first PUSCH or a last PUSCH among the plurality of PUSCHs or a PUSCH that obtains the maximum second time value; wherein the PUSCH that obtains the maximum second time value is a PUSCH corresponding to a maximum fifth parameter value and/or sixth parameter value and/or seventh parameter value.

Optionally, the determining the second time value according to part of the second set of parameter values corresponding to the plurality of PUSCHs includes at least one of the following: determining the second time value according to a maximum value of fifth parameter values respectively corresponding to the plurality of PUSCHs; determining the second time value according to a maximum value of sixth parameter values respectively corresponding to the plurality of PUSCHs; determining the second time value according to a maximum value of seventh parameter values respectively corresponding to the plurality of PUSCHs; wherein the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs.

Optionally, the sending downlink transmission to the terminal, wherein a time condition determined based on the time value is met between the downlink transmission and a first symbol of an earliest channel among the overlapped PUCCH and PUSCH or the overlapped PUCCHs includes: sending each PDCCH in the first PDCCH set to the terminal, wherein the first symbol is no before a symbol starting after the second time value after the last symbol of any PDCCH in the first PDCCH set, wherein the first PDCCH set includes the PDCCH for scheduling the PDSCH or SPS PDCSH release that requires HARQ-ACKS feedback on the PUCCH, and a PDCCH for scheduling the PUSCH.

An embodiment of the present disclosure provides a terminal includes: a transceiver, a memory, a processor, and a program stored in the memory and executed by the processor, wherein the processor executes the program to implements the following steps: when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determining the time value according to parameter values corresponding to each of the plurality of channels or according to parameter values corresponding to part of the plurality of channels or according to part of parameter values corresponding to the plurality of channels, wherein the parameter values are used to determine the time value; performing a timeline condition adjustment for a first symbol of an earliest channel among the overlapped PUCCH and PUSCH or the plurality of overlapped PUCCHs based on the time value.

Optionally, the processor executes the program to implements the following steps: if there are a plurality of downlink channels for which hybrid automatic repeat request acknowledges (HARQ-ACKS) needs to be transmitted on a same PUCCH, or if there are a plurality of downlink channels for which the HARQ-ACKS needs to be transmitted on the same PUCCH and the first set of parameter values corresponding to the plurality of downlink channels are different, determining the first time value according to the first set of parameter values corresponding to each of the plurality of downlink channels or according to the first set of parameter values corresponding to part of the plurality of downlink channels or according to part of the first set of parameter values corresponding to the plurality of downlink channels; wherein, the downlink channel is a physical downlink shared channel (PDSCH) and/or a semi-persistent scheduling SPS PDSCH release; when the downlink channel is the PDSCH, the first set of parameter values include a first parameter value and/or a second parameter value and/or a third parameter value, and the first parameter value is determined according to a mapping type and/or a transmission duration of the PDSCH, the second parameter value is determined according to whether Downlink Control Information (DCI) scheduling the PDSCH indicates a bandwidth part (BWP) switching, and the third parameter value is determined according to a processing capability of the terminal and a reference subcarrier spacing; when the downlink channel is the SPS PDSCH release, the first set of parameter values include a fourth parameter value, and the fourth parameter value is determined according to a subcarrier spacing of the PDCCH that provides the SPS PDSCH release and the processing capability of the terminal.

Optionally, the processor executes the program to implements the following steps: determining the first time value corresponding to each downlink channel according to the first set of parameter values corresponding to each downlink channel; the performing a timeline condition adjustment for a first symbol of an earliest channel among the overlapped PUCCH and PUSCH or the plurality of overlapped PUCCHs based on the time value includes: determining that the first symbol is not before a symbol starting after the first time value corresponding to each downlink channel after a last symbol of each downlink channel.

Optionally, the processor executes the program to implements the following steps: determining the first time value according to the first set of parameter values corresponding to a first downlink channel or a last downlink channel among the plurality of downlink channels or a downlink channel that obtains a maximum first time value; wherein the downlink channel that obtains the maximum first time value is a downlink channel corresponding to a maximum first parameter value and/or second parameter value and/or third parameter value.

Optionally, the processor executes the program to implements the following steps: determining the first time value according to a maximum value of first parameter values corresponding to the plurality of downlink channels; determining the first time value according to a maximum value of second parameter values corresponding to the plurality of downlink channels; determining the first time value according to a maximum value of third parameter values corresponding to the plurality of downlink channels; wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

Optionally, the processor executes the program to implements the following steps: determining that the first symbol is not before a symbol starting after the first time value after the last symbol of any one of the plurality of downlink channels.

Optionally, the processor executes the program to implements the following steps: when there are a plurality of PUSCHs overlapping with the PUCCH, or when there are the plurality of PUSCHs overlapping with the PUCCH and a second set of parameter values corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs, wherein the second set of parameter values are used to determine the second time value; wherein the second set of parameter values include a fifth parameter value and/or a sixth parameter value and/or a seventh parameter value; the fifth parameter value is determined based on demodulation reference signal (DMRS) configuration of the PUSCH; the sixth parameter value is determined according to whether the DCI scheduling the PUSCH indicates a BWP switching; the seventh parameter value is determined according to an update set of an aperiodic channel state information (A-CSI) report included in the PUSCH.

Optionally, the processor executes the program to implements the following steps: determining the second time value corresponding to each PUSCH according to the second set of parameter values corresponding to each PUSCH; the performing a timeline condition adjustment for a first symbol of an earliest channel among the overlapped PUCCH and PUSCH or the plurality of overlapped PUCCHs based on the time value includes: determining that the first symbol is not before a symbol starting after the second time value after a last symbol of any PDCCH in a first PDCCH set, wherein the first PDCCH set includes the PDCCH for scheduling the PDSCH or SPS PDSCH release that requires HARQ-ACKS feedback on the PUCCH, and the PDCCH for scheduling the PUSCH.

Optionally, the processor executes the program to implements the following steps: determining the second time value according to the second set of parameter values corresponding to a first PUSCH or a last PUSCH among the plurality of PUSCHs or a PUSCH that obtains the maximum second time value; wherein the PUSCH that obtains the maximum second time value is a PUSCH corresponding to a maximum fifth parameter value and/or sixth parameter value and/or seventh parameter value.

Optionally, the processor executes the program to implements the following steps: determining the second time value according to a maximum value of fifth parameter values respectively corresponding to the plurality of PUSCHs; determining the second time value according to a maximum value of sixth parameter values respectively corresponding to the plurality of PUSCHs; determining the second time value according to a maximum value of seventh parameter values respectively corresponding to the plurality of PUSCHs; wherein the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs.

Optionally, the processor executes the program to implements the following steps: determining that the first symbol is not before a symbol starting after the second time value after a last symbol of any PDCCH in a first PDCCH set, wherein the first PDCCH set includes a PDCCH for scheduling the PDSCH or SPS PDSCH release that requires HARQ-ACKS feedback on the PUCCH, and the PDCCH for scheduling the PUSCH.

An embodiment of the present disclosure provides a base station includes: a transceiver, a memory, a processor, and a program stored on the memory and executed by the processor, wherein the processor executes the program to implement the following steps: when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determining the time value according to parameter values corresponding to each of the plurality of channels or according to parameter values corresponding to part of the plurality of channels or according to part of parameter values corresponding to the plurality of channels, wherein the parameter values are used to determine the time value; and sending downlink transmission to the terminal, wherein a time condition determined based on the time value is met between the downlink transmission and a first symbol of an earliest channel among the overlapped PUCCH and PUSCH or the overlapped PUCCHs.

Optionally, the processor executes the program to implements the following steps: if there are a plurality of downlink channels for which hybrid automatic repeat request acknowledges (HARQ-ACKS) needs to be transmitted on a same PUCCH, or if there are a plurality of downlink channels for which the HARQ-ACKS needs to be transmitted on the same PUSCH and the first set of parameter values corresponding to the plurality of downlink channels are different, determining the first time value according to the first set of parameter values corresponding to each of the plurality of downlink channels or according to the first set of parameter values corresponding to part of the plurality of downlink channels or according to part of the first set of parameter values corresponding to the plurality of downlink channels; wherein, the downlink channel is a physical downlink shared channel (PDSCH) and/or a semi-persistent scheduling SPS PDSCH release; when the downlink channel is the PDSCH, the first set of parameter values include a first parameter value and/or a second parameter value and/or a third parameter value, and the first parameter value is determined according to a mapping type and/or a transmission duration of the PDSCH, the second parameter value is determined according to whether Downlink Control Information (DCI) scheduling the PDSCH indicates a bandwidth part (BWP) switching, and the third parameter value is determined according to a processing capability of the terminal and a reference subcarrier spacing; when the downlink channel is the SPS PDSCH release, the first set of parameter values include a fourth parameter value, and the fourth parameter value is determined according to a subcarrier spacing of the PDCCH that provides the SPS PDSCH release and the processing capability of the terminal.

Optionally, the processor executes the program to implements the following steps: determining the first time value corresponding to each downlink channel according to the first set of parameter values corresponding to each downlink channel; the sending downlink transmission to the terminal, wherein a time condition determined based on the time value is met between the downlink transmission and a first symbol of an earliest channel among the overlapped PUCCH and PUSCH or the overlapped PUCCHs includes: sending a plurality of downlink channels to the terminal, wherein the first symbol is no before a symbol starting after the first time value corresponding to each downlink channel after a last symbol of each downlink channel.

Optionally, the processor executes the program to implements the following steps: determining the first time value according to the first set of parameter values corresponding to a first downlink channel or a last downlink channel among the plurality of downlink channels or a downlink channel that obtains a maximum first time value; wherein the downlink channel that obtains the maximum first time value is a downlink channel corresponding to a maximum first parameter value and/or second parameter value and/or third parameter value.

Optionally, the processor executes the program to implements the following steps: determining the first time value according to a maximum value of first parameter values corresponding to the plurality of downlink channels; determining the first time value according to a maximum value of second parameter values corresponding to the plurality of downlink channels; determining the first time value according to a maximum value of third parameter values corresponding to the plurality of downlink channels; wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

Optionally, the processor executes the program to implements the following steps: sending the plurality of downlink channels to the terminal, wherein the first symbol is not before a symbol starting after the first time value after the last symbol of any one of the plurality of downlink channels.

Optionally, the processor executes the program to implements the following steps: when there are a plurality of PUSCHs overlapping with the PUCCH, or when there are the plurality of PUSCHs overlapping with the PUCCH and a second set of parameter values corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs, wherein the second set of parameter values are used to determine the second time value; wherein the second set of parameter values include a fifth parameter value and/or a sixth parameter value and/or a seventh parameter value; the fifth parameter value is determined based on demodulation reference signal (DMRS) configuration of the PUSCH; the sixth parameter value is determined according to whether the DCI scheduling the PUSCH indicates a BWP switching; the seventh parameter value is determined according to an update set of an aperiodic channel state information (A-CSI) report included in the PUSCH.

Optionally, the processor executes the program to implements the following steps: determining the second time value corresponding to each PUSCH according to the second set of parameter values corresponding to each PUSCH; the sending downlink transmission to the terminal, wherein a time condition determined based on the time value is met between the downlink transmission and a first symbol of an earliest channel among the overlapped PUCCH and PUSCH or the overlapped PUCCHs includes: sending each PDCCH in the first PDCCH set to the terminal, wherein the first symbol is not before a symbol starting after the second time value corresponding to each PUSCH after the last symbol of any PDCCH in the first PDCCH set, wherein the first PDCCH set includes the PDCCH for scheduling the PDSCH or SPS PDSCH release that requires HARQ-ACKS feedback on the PUCCH, or a PDCCH for scheduling the PUSCH.

Optionally, the processor executes the program to implements the following steps: determining the second time value according to the second set of parameter values corresponding to a first PUSCH or a last PUSCH among the plurality of PUSCHs or a PUSCH that obtains the maximum second time value; wherein the PUSCH that obtains the maximum second time value is a PUSCH corresponding to a maximum fifth parameter value and/or sixth parameter value and/or seventh parameter value.

Optionally, the processor executes the program to implements the following steps: determining the second time value according to a maximum value of fifth parameter values respectively corresponding to the plurality of PUSCHs; determining the second time value according to a maximum value of sixth parameter values respectively corresponding to the plurality of PUSCHs; determining the second time value according to a maximum value of seventh parameter values respectively corresponding to the plurality of PUSCHs; wherein the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs.

Optionally, the processor executes the program to implements the following steps: sending each PDCCH in the first PDCCH set to the terminal, wherein the first symbol is no before a symbol starting after the second time value after the last symbol of any PDCCH in the first PDCCH set, wherein the first PDCCH set includes the PDCCH for scheduling the PDSCH or SPS PDCSH release that requires HARQ-ACKS feedback on the PUCCH, and a PDCCH for scheduling the PUSCH.

An embodiment of the present disclosure provides a terminal, includes: a first determining module, configured to, when there are overlapped physical uplink control channel (PUCCH) and physical uplink shared channel (PUSCH), or there are overlapped PUCCHs, if there are a plurality of channels corresponding to parameter value, or if there are the plurality of channel corresponding to parameter values and the parameter values corresponding to the plurality of channels are different, determine the time value according to parameter values corresponding to each of the plurality of channels or according to parameter values corresponding to part of the plurality of channels or according to part of parameter values corresponding to the plurality of channels, wherein the parameter values are used to determine the time value; a first judging module, configured to perform a timeline condition adjustment for a first symbol of an earliest channel among the overlapped PUCCH and PUSCH or the plurality of overlapped PUCCHs based on the time value.

An embodiment of the present disclosure provides a base station, includes: a second determining module, configured to, when there are overlapped physical uplink control channel (PUCCH) and physical uplink shared channel (PUSCH), or there are overlapped PUCCHs, if there are a plurality of channels corresponding to parameter values, or if there are the plurality of channel corresponding to parameter values and the parameter values corresponding to the plurality of channels are different, determine the time value according to parameter values corresponding to each of the plurality of channels or according to parameter values corresponding to part of the plurality of channels or according to part of parameter values corresponding to the plurality of channels, wherein the parameter values are used to determine the time value; a sending module, configured to send downlink transmission to the terminal, wherein a time condition determined based on the time value is met between the downlink transmission and a first symbol of an earliest channel among the overlapped PUCCH and PUSCH or the overlapped PUCCHs.

An embodiment of the present disclosure provides a computer-readable storage medium having a computer program stored thereon, wherein the computer program is executed by a processor to implement the uplink channel transmission method.

The beneficial effect of the technical solution of the present disclosure is as follows, when there are overlapped PUCCH and PUSCH or a plurality of overlapped PUCCHs, the time value is determined according to the parameter values corresponding to each channel or part of the plurality of channels or according to part of the parameter values corresponding to the plurality of channels, and the method used to determine the time value used to determine the time condition is given, thereby avoiding incorrect scheduling or incorrect transmission caused by the terminal and the base station due to different understandings of the parameters used to determine the time value and improving the transmission efficiency of the system.

BRIEF DESCRIPTION OF THE DRAWINGS

FIG. 1 shows a schematic flowchart of an uplink channel transmission method according to some embodiments of the present disclosure;

FIG. 2 shows a schematic diagram of a channel transmission process between the terminal and the base station according to some embodiments of the present disclosure;

FIG. 3 shows another schematic diagram of a channel transmission process between the terminal and the base station according to some embodiments of the present disclosure;

FIG. 7 shows still yet another schematic diagram of a channel transmission process between the terminal and the base station according to some embodiments of the present disclosure;

FIG. 8 shows still yet another schematic diagram of a channel transmission process between the terminal and the base station according to some embodiments of the present disclosure;

FIG. 9 shows another schematic flowchart of an uplink channel transmission method according to some embodiments of the present disclosure;

DETAILED DESCRIPTION

Figure 4:
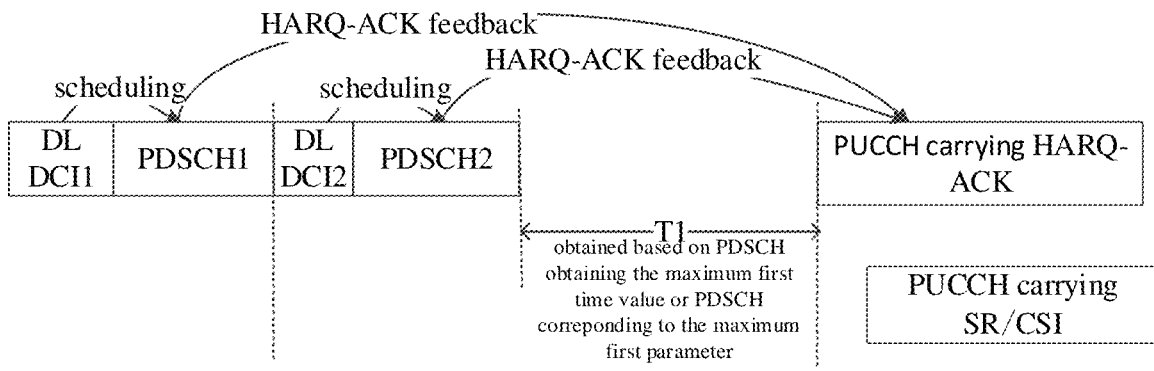
FIG. 4 shows yet another schematic diagram of a channel transmission process between the terminal and the base station according to some embodiments of the present disclosure.

In order to make the technical problems, technical solutions, and advantages to be solved by the present disclosure clearer, a detailed description will be given below in conjunction with the accompanying drawings and specific embodiments. In the following description, specific details such as specific configurations and components are provided only for a comprehensive understanding of the embodiments of the present disclosure. Therefore, it should be clear to those skilled in the art that various changes and modifications can be made to the embodiments described herein without departing from the scope and spirit of the present disclosure. In addition, for clarity and conciseness, descriptions of known functions and configurations are omitted.

It should be understood that "one embodiment" or "an embodiment" mentioned throughout the disclosure means that a specific feature, structure, or characteristic related to the embodiment is included in at least one embodiment of the present disclosure. Therefore, "in one embodiment" or "in an embodiment" in various places throughout the disclosure do not necessarily refer to the same embodiment. In addition, these specific features, structures, or characteristics can be combined in one or more embodiments in any suitable manner.

In the various embodiments of the present disclosure, it should be understood that the value of the sequence number of the following processes does not mean the order of execution. The execution order of each process should be determined by its function and internal logic, and should not constitute any limitation for the implementation process of the present disclosure.

In addition, the terms "system" and "network" in this disclosure are often used interchangeably.

In the embodiments provided in the present disclosure, it should be understood that "B corresponding to A" means that B is associated with A, and B can be determined according to A. However, it should also be understood that determining B based on A does not mean that B is determined only based on A, and B can also be determined based on A and/or other information.

In some embodiments of the present disclosure, the form of the access network is not limited, and may include Macro Base Station, Pico Base Station, Node B (the name of 3G mobile base station), and enhanced base station (eNB), home enhanced base station (Femto eNB or Home eNode B or Home eNB or HeNB), relay station, access point, Remote Radio Unit (RRU), Remote Radio Head (RRH), etc. The user terminal can be a mobile phone (or cell phone), or other devices capable of sending or receiving wireless signals, including user equipment, personal digital assistants (PDA), wireless modems, wireless communication devices, handheld devices, laptop computers, cordless phones, Wireless Local Loop (WLL) station, Customer Premise Equipment (CPE) that can convert mobile signals into WiFi signals or mobile smart hotspots, smart home appliances, or other devices that can spontaneously communicate with mobile communication networks without human operation, etc.

Specifically, the embodiments of the present disclosure provide an uplink channel transmission method, which solves the problem that when there are overlapped PUCCH and PUSCH or overlapped PUCCHs in the 5G NR system in the related art, the time value used to determine the time condition cannot be determined.

As shown in FIG. 1, the embodiment of the present disclosure provides an uplink channel transmission method, which is applied to a terminal, and specifically includes the following steps:

Step 11: When there are overlapped physical uplink control channel (PUCCH) and physical uplink shared channel (PUSCH), or there are overlapped PUCCHs, if there are a plurality of channels corresponding to parameter values used to determine a time value, or if there are the plurality of channel corresponding to parameter values and the parameter values used to determine the time value corresponding to the plurality of channels are different, determining the time value according to a parameter value corresponding to each of the plurality of channels or according to parameter values corresponding to part of the plurality of channels or according to part of parameter values corresponding to the plurality of channels.

5G NR does not support simultaneous transmission of PUCCH and PUSCH in the Rel-15 phase (time-domain resource overlap). When all or part of the symbols of PUCCH and PUSCH overlap, whether the pre-defined time condition is met is determined for the first symbol in firstly initialized channel of PUCCH and PUSCH. In addition, PUCCHs carrying different UCI types may also overlap in the time domain. In the Rel-15 phase of 5G NR, the simultaneous transmission of a plurality of PUCCHs overlapping with to each other on the same carrier are not supported. If a plurality of PUCCHs overlap, whether the pre-defined time condition is met is determined for the first symbol in firstly initialized channel of overlapped PUCCH. For a plurality of overlapped PUCCHs or overlapped PUCCH and PUSCH, if there are a plurality of channels corresponding to the parameter value, or when there are a plurality of channels corresponding to the parameter value and the parameter values used to determine the time value and corresponding to the plurality of channels are different, and the terminal and the base station may cause incorrect scheduling or incorrect transmission due to different understandings of the parameters used to determine the time value.

In the embodiment of the present disclosure, when there are a plurality of channels corresponding to parameter values, or when there are a plurality of channels corresponding to the parameter values and the parameter values corresponding to the plurality of channels are different, the time value is determined according to a parameter value and corresponding to each of the plurality of channels; or, the time value is determined according to parameter values corresponding to the part of the channels in the plurality of channels; or, the time value is determined according to the part of parameter values corresponding to the plurality of channels. This embodiment provides a method used to determine the time value used to determine the time condition when the PUCCH and the PUSCH overlap, or when a plurality of PUCCHs overlap, thereby avoiding incorrect scheduling or incorrect transmission caused by the terminal and the base station due to different understandings of the parameters used to determine the time value.

Step 12: performing a timeline condition adjustment on a first symbol of an earliest channel among the overlapped PUCCH and PUSCH or the plurality of overlapped PUCCHs based on the time value.

Based on the time value, the terminal performs a timeline condition adjustment on the first symbol of the earliest channel among overlapped channels. Optionally, if all or part of the symbols of PUCCH and PUSCH overlap, when the first symbol meets the time condition, the UCI carried on the PUCCH can be transferred to the PUSCH for transmission, so that the PUCCH is no longer transmitted, thereby avoid transmission of PUCCH and PUSCH simultaneously.

If there is overlap between PUCCHs carrying different UCI types in the time domain, when the first symbol meets the time condition, UCI on the plurality of PUCCHs can be combined for transmission, such as being combined for transmission on one PUCCH channel, thereby avoiding parallel transmission of the plurality of PUCCHs.

In the embodiments of the present disclosure, when there are overlapped PUCCH and PUSCH or a plurality of overlapped PUCCHs, the time value is determined according to the parameter values corresponding to each channel or part of the plurality of channels or according to part of the parameter values corresponding to the plurality of channels, and the method used to determine the time value used to determine the time condition is given, thereby avoiding incorrect scheduling or incorrect transmission caused by the terminal and the base station due to different understandings of the parameters used to determine the time value and improving the transmission efficiency of the system.

Specifically, the step 11 includes: if there are a plurality of downlink channels for which the hybrid automatic repeat request acknowledges HARQ-ACKS needs to be transmitted on the same PUCCH, or if there are a plurality of downlink channels for which the hybrid automatic repeat request acknowledges HARQ-ACKS needs to be transmitted on the same PUSCH and the first set of parameter values corresponding to the plurality of downlink channels are different, determining the first time value according to the first set of parameter values corresponding to each of the plurality of downlink channels or according to the first set of parameter values corresponding to part of the plurality of downlink channels or according to part of the first set of parameter values corresponding to the plurality of downlink channels.

Wherein, the downlink channel is a physical downlink shared channel PDSCH and/or semi-persistent scheduling (SPS) PDSCH release.

When the downlink channel is the PDSCH, the first set of parameter values includes a first parameter value and/or a second parameter value and/or a third parameter value, and the first parameter value is determined according to a mapping type and/or a transmission duration of the PDSCH, the second parameter value is determined according to whether the Downlink Control Information (DCI) scheduling the PDSCH indicates the bandwidth part (BWP) switching, and the third parameter value is determined according to a processing capability of the terminal and a reference subcarrier spacing; wherein the reference subcarrier spacing is the smallest subcarrier spacing among PDSCH and overlapped uplink channels (such as PUCCH, or PUCCH and PUSCH). Optionally, when the downlink channel is the PDSCH, the first parameter used to determine the first time value is $d_{1,1}$, and the second parameter used to determine the first time value is $d_{1,2}$, and the third parameter used to determine the first time value is $N_1$.

When the downlink channel is SPS PDSCH release, the parameter value used to determine the first time value includes a fourth parameter value, and the fourth parameter value is determined according to the subcarrier spacing of the physical downlink control channel PDCCH that provides the SPS PDSCH release and a processing capability of the terminal. Optionally, when the downlink channel is SPS PDSCH release, the fourth parameter used to determine the first time value is N.

In this embodiment, the plurality of downlink channels are transmitted on the same or different carriers. Optionally, the time value used for timeline condition adjustment includes the first time value. For a plurality of overlapped PUCCHs or the overlapped PUCCH and PUSCH, if there are a plurality of downlink channels for which the HARQ-ACKS needs to be transmitted on the same PUCCH, or if there are a plurality of downlink channels for which the HARQ-ACKS needs to be transmitted on the same PUCCH and the parameter values used to determine the first time value and corresponding to the plurality of downlink channels are different, the method used to determine the first time value include but are not limited to the following:

Mode 1: Determining the first time value according to the first set of parameter values corresponding to each of the plurality of downlink channels;

Mode 2: Determining the first time value according to the first set of parameter values corresponding to part of the plurality of downlink channels;

Mode 3: Determining the first time value according to part of the parameter values used to determine the first time value and corresponding to the plurality of downlink channels.

For the above-mentioned mode 1, the determining the first time value according to the first set of parameter values corresponding to each of the plurality of downlink channels includes:

determining the first time value corresponding to each downlink channel according to the first set of parameter values corresponding to each downlink channel:

since the downlink channel is PDSCH and/or SPS PDSCH release, when the downlink channel is PDSCH, the first set of parameter values corresponding to each downlink channel includes: the first parameter value and/or the second parameter value and/or the third parameter value; that is, the first time value corresponding to each PDSCH is determined according to the first parameter value and/or the second parameter value and/or the third parameter value corresponding to each PDSCH.

When the downlink channel is SPS PDSCH release, the first set of parameter values corresponding to each downlink channel includes: the fourth parameter value; that is, the first time value corresponding to each SPS PDSCH release is determined according to the fourth parameter value corresponding to each SPS PDSCH release.

For the above mode 1, the step 12 includes: determining that the first symbol is not before a symbol starting after the first time value corresponding to each downlink channel after the last symbol of each downlink channel.

In this embodiment, since the downlink channel is PDSCH and/or SPS PDSCH release, when the downlink channel is PDSCH, the implementing the timeline condition adjustment on the first symbol based on the first time value is: determining whether the first symbol is not before a symbol starting after the first time value corresponding to each PDSCH after the last symbol of each PDSCH; when the downlink channel is SPS PDSCH release, the implementing the timeline condition adjustment on the first symbol based on the first time value is: determining whether the first symbol is not before a symbol starting after the first time value corresponding to each SPS PDSCH release after the last symbol of each SPS PDSCH release.

For the second mode, the determining the first time value according to the first set of parameter values corresponding to part of the plurality of downlink channels includes: determining the first time value according to the first set of parameter values corresponding to a first downlink channel or a last downlink channel among the plurality of downlink channels or a downlink channel that can obtain the maximum first time value; wherein, the downlink channel that can obtain the maximum first time value is the downlink channel corresponding to the maximum first parameter value and/or second parameter value and/or third parameter value.

In this embodiment, the downlink channel is PDSCH and/or SPS PDSCH release. When the downlink channel is PDSCH, the first set of parameter values corresponding to part of the plurality of downlink channels includes: the first parameter value and/or the second parameter value and/or the third parameter value; that is, the first time value is determined according to the first parameter value and/or the second parameter value and/or the third parameter value corresponding to the part of PDSCHs.

When the downlink channel is SPS PDSCH release, the parameter values used to determine the first time value and corresponding to the plurality of downlink channels include: a fourth parameter value; that is, the first time value is determined according to the fourth parameter value corresponding to part of SPS PDSCH releases.

For the third mode, the determining the first time value according to part of parameter values used to determine the first time value and corresponding to the plurality of downlink channels includes at least one of the following:

Determining the first time value according to a maximum value of the first parameter values corresponding to the plurality of downlink channels;

Determining the first time value according to a maximum value of the second parameter values corresponding to the plurality of downlink channels;

Determining the first time value according to a maximum value of the third parameter values corresponding to the plurality of downlink channels;

Wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

In this embodiment, when the downlink channel is PDSCH, the first time value is determined according to the maximum value of the first parameter values corresponding to the plurality of PDSCHs, and/or the maximum value of the second parameter values corresponding to the plurality of PDSCHs, and/or the maximum value of the third parameter values corresponding to the plurality of PDSCHs.

Specifically, if a plurality of parameter values need to be used to determine the first time value at the same time, the maximum value of each parameter value needs to be selected to determine the first time value. For example, the first parameter value and the third parameter value need to be used to determine the first time value. The first time value is determined by using the maximum value of the first parameter values corresponding to the plurality of downlink channels and the maximum value of the third parameter values corresponding to the plurality of downlink channels. Of course, the maximum value of the first parameter values corresponding to the plurality of downlink channels is used to calculate the first time value. At this time, if other parameter values are required, the other parameter values may not be the maximum value.

When the downlink channel is the SPS PDSCH release, the first time value is determined according to the maximum value of the fourth parameter values corresponding to the plurality of SPS PDSCH releases.

When the downlink channel is PDSCH and SPS PDSCH release, the corresponding first time value is calculated according to the above-mentioned method for PDSCH and SPS PDSCH release respectively, wherein first time values corresponding to PDSCH and SPS PDSCH release are calculated separately, and the timeline condition adjustment based on the first time value is implemented for each channel.

For mode 2 and mode 3, the step 12 includes: determining that the first symbol is not before a symbol starting after the first time value after the last symbol of any one of the plurality of downlink channels.

In this embodiment, since the downlink channel is PDSCH and/or SPS PDSCH release, when the downlink channel is PDSCH, the implementing the timeline condition adjustment on the first symbol based on the first time value is: determining whether the first symbol is not before a symbol starting after the first time value after the last symbol of any one of the plurality of PDSCHs.

When the downlink channel is SPS PDSCH release, the implementing the timeline condition adjustment on the first symbol based on the first time value is: determining whether the first symbol is not before a symbol starting after the first time value after the last symbol of any one of the plurality of SPS PDSCH releases.

The method used to determine the first time value is described above in three modes. The method used to determine the first time value is described below in conjunction with specific exemplary embodiments:

In the first embodiment, taking the downlink channel as the PDSCH as an example, it is assumed that the terminal has a PUCCH in a time slot of the primary carrier component (PCC) to transmit HARQ-ACKS at the same time, and the PUCCH carries the HARQ-ACKS corresponding to the two PDSCHs, there is also a PUCCH that carries a scheduling request (SR) and/or channel state information (CSI), and the two PUCCH time domain resources overlap. Assume that the first parameter corresponding to PDSCH1 in the two PDSCHs $d_{1,1}=3$, the first parameter corresponding to PDSCH2 in the two PDSCHs $d_{1,1}=0$, assume that the value of the third parameter $N_1$ corresponding to PDSCH1 and PDSCH2 is the same, assuming the calculation formula of the first time value $T_1$ is as follows:

$$T_1 = (N_1 + d_{1,1} + 1) \cdot (2048 + 144) \cdot \kappa \cdot 2^{-\mu} \cdot T_c$$

Among them, $T_1$ is the first time value; $N_1$ is the third parameter, and $N_1$ is the PDSCH processing time determined according to the terminal processing capabilities (capability 1 and capability 2) and µ (expressed as the number of symbols, for example, it is determined that the terminal processing capacity is capability 1 or capability 2 according to configuration information, and then the value of $N_1$ is determined according to p in the corresponding table); $d_{1,1}$ is the first parameter; κ is a ratio of a basic time unit of Long Term Evolution (LTE) to the basic time unit of NR; µ is the serial number of the smallest subcarrier spacing among the subcarrier spacing used by the PDCCH (DCI) scheduling PDSCH, overlapped PUCCH and PUSCH, that is the seral number used to determine the parameter subcarrier spacing of $N_1$; $T_c$ is the basic time unit in NR.

Among them, $d_{1,1}$ is related to PDSCH transmission duration and mapping type. For example, when PDSCH uses a mapping type A, if i<7, then $d_{1,1}=7-i$, otherwise $d_{1,1}=0$, where i is the number of symbols occupied by PDSCH; when PDSCH uses a mapping type B, for processing capability capability1, when PDSCH occupies 7 symbols, $d_{1,1}=0$, when PDSCH occupies 4 symbols, $d_{1,1}=3$, when PDSCH occupies 2 symbols, $d_{1,1}=3+d$, where d is the number of overlapped symbols between the PDSCH and the PDCCH scheduling PDSCH.

In the first embodiment, the method used to determine $T_1$ includes but is not limited to the following methods.

Method 1-1. Determining $T_1$ independently for each PDSCH, then $T_1$ of PDSCH1 is determined according to the corresponding $d_{1,1}=3$, and $d_{1,1}=3$ is substituted into the above calculation formula to obtain T1-PDSCH1; $T_1$ of PDSCH2 is determined according to the corresponding $d_{1,1}=0$, $d_{1,1}=0$ is substituted into the above calculation formula to get T1-PDSCH2. Then, the time condition is determined between each PDSCH and the first symbol of the earliest channel in a set of overlapped channels respectively, that is, it is determined whether the first symbol of the earliest channel in the overlapped channels is not before a symbol starting whose starting position is after $T_1$ after the last symbol of the PDSCH, as shown in FIG. 2, where DL DCI1 in FIG. 2 is the PDCCH for scheduling PDSCH1, and DL DCI2 is the PDCCH for scheduling PDSCH2.

Method 1-2: Determining the first time value according to the parameter value and corresponding to part of the plurality of PDSCHs.

Method 1-2.1: Determining the first time value according to the parameter value corresponding to the last PDSCH of the plurality of PDSCHs. Since $d_{1,1}$ corresponding to the last PDSCH (PDSCH2) is $d_{1,1}=0$, $d_{1,1}=0$ can be substituted into the above calculation formula to determine $T_1$, and then based on this $T_1$, the time condition is determined between each PDSCH and the first symbol in the earliest channel in the set of overlapped channels, the determination method is the same as that of the above method 1, as shown in FIG. 3. Among them, DL DCI1 in FIG. 3 is the PDCCH for scheduling PDSCH1, and DL DCI2 is the PDCCH for scheduling PDSCH2, because each of PDSCH1 and PDSCH2 determines whether the time condition is satisfied between each of PDSCH1 and PDSCH2 and the target symbol according to the same $T_1$. Obviously, when the last PDSCH meets the time condition, all the previous PDSCHs meet the time condition.

Method 1-2.2: Determining the first time value according to the parameter value corresponding to the PDSCH that can obtain the maximum first time value among a plurality of PDSCHs. Since the $d_{1,1}$ corresponding to PDSCH1 has the maximum value $d_{1,1}=3$, the maximum $T_1$ can be obtained, and $d_{1,1}=3$ can be substituted into the above calculation formula to determine $T_1$, and then based on this $T_1$, the time condition is determined between each PDSCH and the first symbol in the earliest channel in the set of overlapped channels, and the determination method is the same as the above method 1-1, as shown in FIG. 4.

Method 1-2.3: Determining the first time value according to the parameter value corresponding to the first PDSCH of the plurality of PDSCHs. The first PDSCH is PDSCH1, $d_{1,1}=3$ corresponding to PDSCH1, then $d_{1,1}=3$ is substituted into the above calculation formula to determine $T_1$, and then based on this $T_1$ the time condition is determined between each PDSCH and the first symbol in the earliest channel in the set of overlapped channels, and the determination method is the same as the above method 1-1.

Method 1-3: Determining the first time value according to the maximum value of the first parameter values respectively corresponding to the plurality of PDSCHs. $T_1$ is determined according to the maximum value of $d_{1,1}$ corresponding to a plurality of PDSCHs, that is, $d_{1,1}=3$, then $d_{1,1}=3$ is substituted into the above calculation formula to determine $T_1$, and then based on the $T_1$, the time condition is determined between each PDSCH and the first symbol in the earliest channel in the set of overlapped channels, and the determination method is the same as the above method 1-1, as shown in FIG. 4.

It should be noted that, in the first embodiment above, if the third parameter $N_1$ values corresponding to different PDSCHs are different, the difference in the values of $N_1$ also needs to be considered in the above methods. For example, for the above method 1-2.2, $T_1$ can be determined based on the PDSCH with the maximum values of $d_{1,1}$ and $N_1$ at the same time. If the PDSCHs with the maximum values of $d_{1,1}$ and $N_1$ is not the same PDSCH, then one of the PDSCHs is selected to determine $T_1$, For example, the PDSCH corresponding to a larger $N_1$ is selected or the PDSCH with the maximum value of $T_1$ is selected to determine $T_1$. For example, for the above method 1-3, $T_1$ is determined according to the corresponding maximum $d_{1,1}$ value and the corresponding maximum $N_1$ value in a plurality of PDSCHs, where the maximum $d_{1,1}$ and the maximum $N_1$ may correspond to the same PDSCH, or they may correspond to different PDSCHs. For another example, $N_1$ can be obtained by querying the corresponding Table 1 and Table 2 according to the terminal processing capability and μ, the terminal processing capability is pre-configured or reported, especially if the current processing capability of the terminal is capability 2, when the subcarrier spacing of PDSCH is 30 kHz (that is, corresponding to μ-PDSCH=1) and more than 136 RBs are scheduled, it needs to fall back to capability1 to determine the $N_1$ value, so the $N_1$ value corresponding to different PDSCHs may also be different. Of course, if different PDSCHs are transmitted on different carriers and use different subcarrier spacing, even if the terminal processing capacity is the same, the $N_1$ obtained by querying the same table will be different.

TABLE 1

Comparison table between $N_1$ and μ when the terminal processing capability is capability1

| | $N_1$ | |
|---|---|---|
| μ | Location of additional DMRS = Position 0 in the DMRS downlink configuration of PDSCH using downlink DMRS mapping rules A and B, that is, when there is no additional DMRS | Location of additional DMRS = non-Position 0 in the DMRS downlink configuration of PDSCH using downlink DMRS mapping rules A and B |
| 0 | 8 | $N_{1,0}$ |
| 1 | 10 | 13 |
| 2 | 17 | 20 |
| 3 | 20 | 24 |

It should be noted that $N_{1,0}$ is a value determined according to the symbol position of the additional DMRS. For example, if the additional DMRS is in the symbol numbered 12, then $N_{1,0}$=14, otherwise $N_{1,0}$=13.

TABLE 2

Comparison table between $N_1$ and μ when the terminal processing capability is capability2

| μ | $N_1$ Location of additional DMRS = Position 0 in the DMRS downlink configuration of PDSCH using downlink DMRS mapping rules A and B, that is, when there is no additional DMRS |
|---|---|
| 0 | 3 |
| 1 | 4.5 |
| 2 | 9 used for frequency area 1 |

The methods used to determine the first time value when the downlink channel is PDSCH is described above through specific embodiments, and the method used to determine the first time value when the downlink channel is SPS PDSCH release is described below through specific embodiments.

In the second embodiment, taking the downlink channel as the SPS PDSCH release as an example. For example, when one or more of the PDSCHs in the first embodiment are replaced with SPS PDSCH release, for SPS PDSCH release, it is assumed that the terminal has a PUCCH in a time slot of the primary carrier component (PCC) to transmit HARQ-ACKS at the same time, and the PUCCH carries the HARQ-ACKS corresponding to the two SPS PDSCH releases, there is also a PUCCH that carries a scheduling request (SR) and/or channel state information (CSI), and the two PUCCH time domain resources overlap. Assuming that the current processing capability of the UE is capability 1, assuming that two SPS PDSCH releases are transmitted on different carriers, SPS PDSCH release1 is transmitted on SCC1, the SCS is 15 kHz, and the corresponding fourth parameter N=10, SPS PDSCH release2 is transmitted on SCC2, the SCS is 30 kHz, and the corresponding fourth parameter N=12, assuming that the calculation formula of the first time value $T_1$ is as follows:

$$T_1 = (N_1 + d_{1,1} + 1) \cdot (2048 + 144) \cdot \kappa \cdot 2^{-\mu} \cdot T_c$$

Wherein, $T_1$ is the first time value; N is the fourth parameter, and the value of N is determined according to the subcarrier spacing of the PDCCH providing SPS PDSCH release and the terminal processing capability; κ is a ratio of the basic time unit of LTE to the basic time units of NR. μ is the serial number of the smallest subcarrier spacing among the subcarrier spacing used by the PDCCH (DCI) scheduling PDSCH, overlapped PUCCH and PUSCH; $T_c$ is the basic time unit in NR.

In the second embodiment, the method used to determine $T_1$ is the same as the method used to determine $T_1$ in the above-mentioned first embodiment, that is, $T_1$ is determined independently according to the fourth parameter value corresponding to each SPS PDSCH release, and the four parameter value corresponding to each SPS PDSCH release is respectively substituted into the above calculation formula to obtain the first time value corresponding to each SPS PDSCH release; or $T_1$ is determined according to the fourth parameter value corresponding to one SPS PDSCH release among a plurality of SPS PDSCH releases, that is, the fourth parameter value corresponding to one SPS PDSCH release is substituted into the above calculation formula to obtain $T_1$. The specific method will not be repeated.

Among them, when the processing capability of the terminal is capability1, the Subcarrier Spacing (SCS) of the PDCCH and N: N=10 when SCS is 15 kHz, N=12 when SCS is 30 kHz, N=22 when SCS is 60 kHz, N=25 when SCS is 120 kHz.

When the processing capability of the terminal is capability2, SCS and N of the PDCCH: N=5 when SCS is 15 kHz, N=5.5 when SCS is 30 kHz, and N=11 when SCS is 60 kHz.

In the second embodiment, if PDSCH and SPS PDSCH release exist at the same time, it is necessary to calculate the corresponding T1 value for PDSCH and SPS PDSCH release respectively according to the above-mentioned different formulas.

It should be noted that both the terminal and the base station can determine the first time value based on the above-mentioned Embodiment 1 or Embodiment 2. When the base station sends scheduling information, it needs to ensure that the target symbol of the PUCCH and the last symbol of each PDSCH met the time condition based on the first time value, the expected determination result of the terminal when determining the time condition is that the time condition is met. If the time condition is not met, it is considered to be a base station scheduling error. The specific transmission can be implemented by the terminal independently. Therefore, in the transmission process, the base station needs to always ensure that the time condition is met during scheduling.

Specifically, the step 11 includes: when there are a plurality of PUSCHs overlapping with the PUCCH, or when there are a plurality of PUSCHs overlapping with the PUCCH and parameter values used to determine the second time value and corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs.

Wherein, the parameter value used to determine the second time value includes a fifth parameter value and/or a sixth parameter value and/or a seventh parameter value; the fifth parameter value is determined based on the demodulation reference signal DMRS configuration of the PUSCH; the sixth parameter value is determined according to whether the DCI scheduling the PUSCH indicates a BWP switching; the seventh parameter value is determined according to an update set of an aperiodic channel state information A-CSI report included in the PUSCH.

Optionally, the fifth parameter used to determine the second time value is $d_{2,1}$, and the sixth parameter used to determine the second time value is $d_{2,2}$, the seventh parameter used to determine the second time value is Z.

In this embodiment, the time value used to determine the time condition includes the second time value. When there are a plurality of PUSCHs overlapping with the PUCCH, or when there are a plurality of PUSCHs overlapping with the PUCCH and parameter values used to determine the second time value and corresponding to the plurality of PUSCHs are different, the method used to determine the second time value is implemented in but not limited to the following modes:

Mode 4: Determining the second time value according to the second set of parameter values corresponding to each PUSCH of the plurality of PUSCHs;

Mode 5: Determining the second time value according to the second set of parameter values corresponding to part of the plurality of PUSCHs;

Mode 6: Determining the second time value according to part of the parameter values used to determine the second time value and corresponding to the plurality of PUSCHs.

With regard to the fourth mode, the determining the second time value according to the second set of parameter values corresponding to each PUSCH of the plurality of PUSCHs includes: determining the second time value corresponding to each PUSCH according to the second set of parameter values corresponding to each PUSCH.

For the fourth mode, the step 12 includes:

It is determined that the first symbol is not before a symbol starting after the second time value corresponding to each PUSCH after the last symbol of any PDCCH in the first PDCCH set, wherein the first PDCCH set includes at least one of a PDCCH for scheduling PDSCH or SPS PDSCH release that requires HARQ-ACKS feedback on the PUCCH, or a PDCCH for scheduling the PUSCH.

In this embodiment, for the case that a plurality of PUSCHs overlap the PUCCH, the first PDCCH set includes the PDCCH for scheduling the PUSCH, and the PDCCH for scheduling the PDSCH or SPS PDSCH release that requires HARQ-ACKS transmission on the PUCCH; for the case that a plurality of PUCCHs overlap, the first PDCCH set includes a PDCCH for scheduling a PDSCH or SPS PDSCH release that requires HARQ-ACKS transmission on the PUCCH.

When determining the time condition based on the second time value, the method specifically includes: taking one of the plurality of second time values corresponding to the plurality of PUSCHs, and for any DCI in the determined first PDCCH set, implementing determination based on the second time value, that is, determining that the first symbol is not before a symbol starting after the current second time value after the last symbol of any one of the above-mentioned DCIs; and then taking another second time value, performing the above determination until the above determination is performed based on each second time value.

For the fifth mode, the determining the second time value according to the second set of parameter values corresponding to part of the PUSCHs in the plurality of PUSCHs further includes: determining the second time value according to the second set of parameter values corresponding to the first PUSCH or the last PUSCH among the plurality of PUSCHs or the PUSCH that can obtain the maximum second time value; wherein the PUSCH that can obtain the maximum second time value is the PUSCH corresponding to the maximum fifth parameter value and/or sixth parameter value and/or seventh parameter value.

For the sixth mode, the determining the second time value according to part of the parameter values used to determine the second time value and corresponding to the plurality of PUSCHs includes at least one of the following:

Determining the second time value according to the maximum value of fifth parameter values respectively corresponding to the plurality of PUSCHs;

Determining the second time value according to the maximum value of sixth parameter values respectively corresponding to the plurality of PUSCHs;

Determining the second time value according to the maximum value of seventh parameter values respectively corresponding to the plurality of PUSCHs;

Wherein, the first PUSCH corresponding to the maximum value of the fifth parameter values, the second PUSCH corresponding to the maximum value of the sixth parameter values, and the third PUSCH corresponding to the maximum value of the seventh parameter values are same PUSCH or different PUSCHs.

In this embodiment, the maximum value of the fifth parameter values corresponding to a plurality of PUSCHs, and/or the maximum value of the sixth parameter values corresponding to the plurality of PUSCHs, and/or the maximum value of the seventh parameter values respectively corresponding to each PUSCH are used to determine the first time value.

Specifically, if a plurality of parameter values need to be used to determine the second time value at the same time, the maximum value of each parameter value needs to be selected to determine the second time value. For example, for PUSCH that does not carry A-CSI, the fifth parameter value and the sixth parameter value are used to determine the second time value, then the maximum value of the fifth parameter values corresponding to a plurality of PUSCHs and the maximum value of the sixth parameter values corresponding to a plurality of PUSCHs are used to determine the second time value; of course; only the maximum value of the sixth parameter values (or the fifth parameter values) corresponding to a plurality of PUSCHs is used to calculate the second time value. At this time, if other parameter values are required, the other parameter values may not be the maximum value; for another example, for the PUSCH carrying A-CSI, the sixth parameter value and the seventh parameter value need to be used to determine the second time value, then the maximum value of the sixth parameter values corresponding to a plurality of PUSCHs and the maximum value of the seventh parameter values corresponding to a plurality of PUSCH are used to determine the second time value; of course, it is also possible to use only the maximum value of the sixth parameter values (or the seventh parameter values) corresponding to a plurality of PUSCHs to calculate the second time value. If other parameter values are needed at this time, the other parameter values may not be the maximum value.

Regarding the mode 5 or mode 6, the step 12 includes: determining that the first symbol is not before a symbol starting after the second time value after the last symbol of any PDCCH in the first PDCCH set, where the first PDCCH set includes the PDCCH scheduling the PDSCH or SPS PDSCH release that requires HARQ-ACKS feedback on the PUCCH, and the PDCCH for scheduling the PUSCH.

The method used to determine the second time value is described above in three modes. The method used to determine the second time value is described below in conjunction with specific exemplary embodiments.

Embodiment 3, assuming the terminal is configured with 3 carriers, PCC and two secondary carriers (Secondary Carrier Component, SCC), the two secondary carriers are SCC1 and SCC2, and the subcarrier spacing of each carrier is the same, assuming that there is one PUCCH transmission on PCC in the time slot n, two time division multiplexing (TDM) PUSCH transmissions on SCC1 in time slot n, and one PUSCH transmission on SCC2 in time slot n. These PUSCHs overlap the PUCCH on PCC. Assuming the fifth parameter $d_{2,1}=0$ corresponding to PUSCH1 on SCC1, and the sixth parameter $d_{2,2}=0$; assuming the fifth parameter $d_{2,1}=1$ corresponding to PUSCH2 on SCC1, and the sixth parameter $d_{2,2}=0$; assuming the fifth parameter $d_{2,1}=0$ corresponding to that PUSCH3 on SCC2, and the sixth parameter $d_{2,2}=10$; assuming the calculation formula of the second time value $T_2$ is as follows:

$$T_2 = \max((N_2 + d_{2,1} + 1) \cdot (2048 + 144) \cdot \kappa \cdot 2^{-\mu} \cdot T_c, d_{2,2})$$

Wherein, $T_2$ is the second time value; $N_2$ is the PDSCH processing time (expressed as the number of symbols) determined according to the processing capabilities (capability1 and capability2) and $\mu$; $d_{2,1}$ is the fifth parameter; $d_{2,2}$ is the sixth parameter; $\kappa$ is the ratio of the basic time unit of LTE to the basic time unit of NR; $\mu$ is the serial number of the smallest subcarrier spacing among the subcarrier spacing used by the PDCCH (DCI) scheduling PDSCH, overlapped PUCCH and PUSCH, $T_c$ is the basic time unit in NR.

Among them, $d_{2,1}$ is related to the DMRS configuration of PUSCH. For example, if the first symbol of PUSCH only contains DMRS, then $d_{2,1}=0$, otherwise $d_{2,1}=1$; $d_{2,2}$ is related to BWP switching, for example, if PDCCH for scheduling the PUSCH triggers the BWP switching, $d_{2,2}$ is the predetermined time required for BWP switching, otherwise $d_{2,2}=0$; other parameters are the same as in the first embodiment.

In the third embodiment, the method used to determine $T_2$ includes but is not limited to the following methods.

Method 3-1: Determining the second time value according to the first PUSCH or the last PUSCH among the plurality of PUSCHs or the PUSCH that can obtain the maximum second time value.

Figure 5:
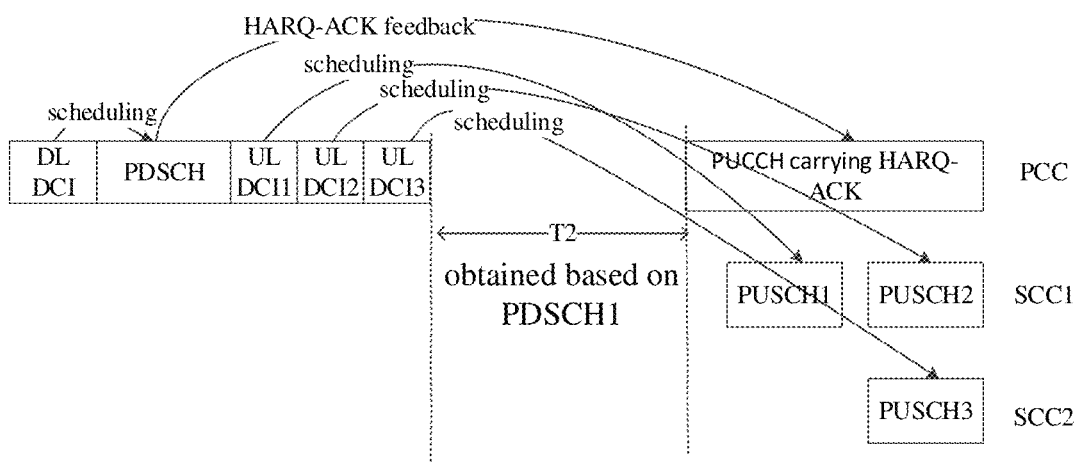
FIG. 5 shows still yet another schematic diagram of a channel transmission process between the terminal and the base station according to some embodiments of the present disclosure.

Method 3-1.1. Determining the second time value according to the first PUSCH of the plurality of PUSCHs. The first PUSCH is PUSCH1, then $d_{2,1}=0$, $d_{2,2}=0$ corresponding to PUSCH1 are substituted into the above calculation formula to determine $T_2$, and then the timeline condition adjustment is performed between each DCI and the first symbol of the earliest channel in the set of overlapping with channels based on the $T_2$, that is, it is determined whether the first symbol of the earliest channel in the overlapping with channels is not earlier than the first symbol after $T_2$ after the last symbol of each DCI. That is, it is to determine whether the $T_2$ spacing is satisfied between the first symbol and the last symbol of each DCI, as shown in FIG. 5, where DL DCI in FIG. 5 is the PDCCH for scheduling PDSCH, UL DCI1 is the PDCCH for scheduling PUSCH1, UL DCI2 is the PDCCH for scheduling PUSCH2, and UL DCI3 is PDCCH for scheduling PUSCH3. Since all DCIs is determined on whether they meet the time condition with the first symbol according to the same $T_2$, it is obvious that when the last DCI meets the time condition, all the previous DCIs meet the time condition.

Figure 6:
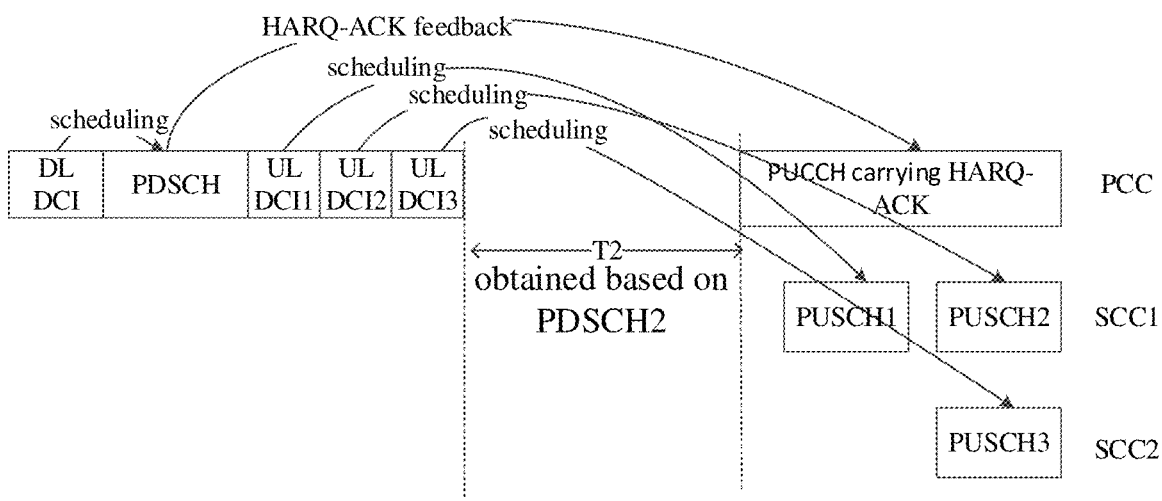
FIG. 6 shows still yet another schematic diagram of a channel transmission process between the terminal and the base station according to some embodiments of the present disclosure.

Method 3-1.2. Determining $T_2$ according to one PUSCH with the maximum $d_{2,1}$, then $d_{2,1}=1$, $d_{2,2}=0$ corresponding to PUSCH2 are substituted into the above calculation formula to determine $T_2$, and then the timeline condition adjustment is performed between the first symbol of the earliest channel in the set of overlapping with channels and each DCI based on the $T_2$, and the determination method is the same as the foregoing method 3-1.1, as shown in FIG. 6. Among them, DL DCI in FIG. 6 is a PDCCH for scheduling PDSCH, UL DCI1 is a PDCCH for scheduling PUSCH1, UL DCI2 is a PDCCH for scheduling PUSCH2, and UL DCI3 is a PDCCH for scheduling PUSCH3.

Method 3-1.3. Determining $T_2$ according to one PUSCH with the maximum $d_{2,2}$, then $d_{2,1}=0$ and $d_{2,2}=10$ are substituted the into the above calculation formula to obtain $T_2$ according to the corresponding parameters of PUSCH3, the timeline condition adjustment is implemented between each DCI and the first symbol of the earliest channel in the set of overlapping with channels based on this $T_2$. The determination method is the same as the above method 3-1.1, as shown in FIG. 7.

Method 3-1.4: Determining $T_2$ according to the PUSCH that can obtain the maximum $T_2$, that is, PUSCH3, and the determination result is the same as the above method 3-1.3.

Method 3-2, $T_2$ is determined according to the maximum $d_{2,1}$ among $d_{2,1}$ corresponding to the plurality of PUSCHs, that is, $d_{2,1}=1$, and the maximum $d_{2,2}$ among $d_{2,2}$ corresponding to the plurality of PUSCHs, that is, $d_{2,2}=10$, then $d_{2,1}=1$ and $d_{2,2}=10$ are substituted into the above calculation formula to determine $T_2$, and then the timeline condition adjustment is performed between each DCI and the first symbol of earliest channel in the set of overlapping with channels based on the $T_2$, and the determination method is the same as the above method 3-1.1, as shown in FIG. 8.

Mode 3-3: Determining a $T_2$ according to each PUSCH of the plurality of PUSCHs, and use each $T_2$ value to determine whether the time condition is satisfied between any DCI in the first PDCCH set and the first symbol.

It should be noted that in the third embodiment above, when SCC and PCC have different subcarrier spacing, there may be PUSCH and PUCCH overlapped in a plurality of different time slots. When $T_2$ is determined based on PUSCH corresponding to maximum $T_2$, the difference in $T_2$ caused by different subcarrier spacing of different PUSCHs can also be considered, that is, the subcarrier spacing corresponding to different PUSCHs are used to calculate the $T_2$ value corresponding to each PUSCH, and the maximum value obtained is used to determine $T_2$ finally. Among them, $N_2$ can be obtained by looking up Table 3 and Table 4 respectively according to μ and terminal processing capabilities. For all PUSCH transmissions, $T_2$ is the same.

TABLE 3

Comparison table between $N_2$ and μ when the terminal processing capability is capability1

| μ | $N_2$ |
|---|---|
| 0 | 10 |
| 1 | 12 |
| 2 | 23 |
| 3 | 36 |

TABLE 4

Comparison table between $N_2$ and μ when the terminal processing capability is capability2

| μ | $N_2$ |
|---|---|
| 0 | 5 |
| 1 | 5.5 |
| 2 | 11 used for frequency area 1 |

The method used to determine the second time value based on the fifth parameter value and/or the sixth parameter value corresponding to PUSCH is described above through specific embodiments. The method used to determine the second time value based on the seventh parameter value corresponding to PUSCH is described above through specific embodiments.

The fourth embodiment, all or part of the PUSCH in the third embodiment are replaced with the PUSCH carrying A-CSI. For example, assuming the terminal is configured with 2 carriers, PCC and SCC1, and the subcarrier spacing of each carrier is the same. There is one PUCCH transmission on the PCC in the time slot n, and there are two TDM PUSCH transmissions on SCC1 that carry aperiodic CSI (A-CSI) in time slot n. These PUSCHs are all overlapped with the PUCCH on the PCC. Assuming that the PUSCH carrying A-CSI corresponds to Z=10, and the PUSCH2 carrying A-CSI corresponds to Z=20. For the PUSCH carrying A-CSI, the calculation formula of the second time value $T_2$ is assumed as follows:

$$T_2 = \max((Z+d)\cdot(2048+144)\cdot\kappa\cdot 2^{-\mu}\cdot T_c, d_{2,2})$$

Where $T_2$ is the second time value; $d_{2,2}$ is the sixth parameter; Z is the seventh parameter; κ is the ratio of the basic time unit of LTE to the basic time unit of NR; μ is the serial number of the smallest subcarrier spacing among the subcarrier spacing used by the PDCCH (DCI) for scheduling the PUSCH and/or PDSCH, the overlapped PUCCH and the PUSCH respectively, and $T_c$ is the basic time unit in NR. The definition of d is as follows: when μ=0, 1, d=2; when μ=2, d=3; when μ=3, d=4.

In the fourth embodiment, for the PUSCH carrying A-CSI, the method used to determine $T_2$ can be referred to the related method of the third embodiment above, that is, assuming that the $d_{2,2}$ values corresponding to a plurality of PUSCHs carrying A-CSI are the same, that is the value of the seventh parameter Z corresponding to the first PUSCH or the last PUSCH of the plurality of PUSCHs carrying A-CSI or the PUSCH that can obtain the maximum second time value is substituted into the above calculation formula to obtain the second time value; or the maximum Z value among Z values corresponding to the plurality of PUSCHs is substituted into the above calculation formula to obtain the second time value, and the specific content will not be repeated. If the $d_{2,2}$ values corresponding to a plurality of PUSCHs carrying A-CSI are different, Z and $d_{2,2}$ need to be considered at the same time to calculate the second time value. For the PUSCH that does not carry A-CSI, the method used to determine $T_2$ is exactly the same as the third embodiment above.

Both the terminal and the base station can determine the second time value based on the above method. When the base station sends scheduling information, it needs to ensure that the time condition of the second time value is met between each DCI for scheduling PDSCH and/or PUSCH and the last symbol of each PDSCH. The expected result for determining the time condition by the terminal is that the time condition is met. If it is not met, it is considered to be scheduling error by the base station. The specific transmission can be realized by the terminal independently, so in the transmission process, the base station needs to always ensure that the time conditions are met during scheduling.

It should be noted that for the first and second embodiments, the timeline condition adjustment based on the second time value also needs to be performed. If there is no PUSCH, the second time value can be calculated according to the calculation formula in the third embodiment and assuming $d_{2,1}=0$ and $d_{2,2}=0$. If there is a PUSCH, the second time value can be determined by referring to the embodiments 3 and 4; among them, the time condition for the second time value is: determining whether the first symbol of the earliest channel in the overlapping with channels is not earlier than the first symbol after $T_2$ after the last symbol of each DCI for scheduling PDSCH (in the embodiments 1 and 2, it is assumed that there is no DCI for scheduling PUSCH. If there is DCI for scheduling PUSCH, such DCI needs to be determined). It is determined whether $T_2$ spacing is satisfied between the first symbol and the last symbol of each DCI. In particular, if all the PDSCHs have no corresponding DCI at this time, and there is no PUSCH or PUSCH has no corresponding DCI, then there is no need to perform timeline condition adjustment based on the second time value.

For Embodiment 3 and Embodiment 4, the timeline condition adjustment based on the first time value also needs to be performed. If there are a plurality of PDSCHs corresponding to transmitting HARQ-ACKS on the same PUCCH, the method used to determine the first time value can refer to the embodiments 1 and 2, the timeline condition adjustment for the first time value is: determining whether the first symbol of the earliest channel in the overlapping with channels is not before a symbol starting after the first time value corresponding to each downlink channel after the last symbol of each downlink channel, or it is determined that the first symbol is not before a symbol starting after the first time value after the last symbol of any one downlink channel of the plurality of downlink channels. In particular, if SR and/or CSI are carried on the PUCCH, there is no need to perform timeline condition adjustment based on the first time value. That is, when there is no downlink transmission that requires HARQ-ACKS feedback, such as no PDSCH and no PDCCH indicating semi-persistent scheduling (SPS) resource release, only the timeline condition adjustment based on the second time value is performed.

In the embodiments of the present disclosure, when there are overlapped PUCCH and PUSCH or a plurality of overlapped PUCCHs, the time value is determined according to the parameter value and corresponding to each channel or part of the plurality of channels or part of the parameter values used to determine the time value and corresponding to the plurality of channels, and the method used to determine the time value used to determine the time condition is given, thereby avoiding incorrect scheduling or incorrect transmission caused by the terminal and the base station due to different understandings of the parameters used to determine the time value and improving the transmission efficiency of the system.

As shown in FIG. 9, the embodiment of the present disclosure provides an uplink channel transmission method, which is applied to a base station, and specifically includes the following steps.

Step 91: When there are overlapped physical uplink control channel (PUCCH) and physical uplink shared channel (PUSCH), or there are overlapped PUCCHs, if there are a plurality of channels corresponding to parameter values used to determine a time value, or if there are the plurality of channel corresponding to parameter values and the parameter values used to determine the time value corresponding to the plurality of channels are different, determining the time value according to a parameter value corresponding to each of the plurality of channels or according to parameter values corresponding to part of the plurality of channels or according to part of parameter values corresponding to the plurality of channels.

5G NR does not support simultaneous transmission of PUCCH and PUSCH in the Rel-15 phase (time-domain resource overlap). When all or part of the symbols of PUCCH and PUSCH overlap, whether the pre-defined time condition is met is determined for the first symbol in firstly initialized channel of PUCCH and PUSCH. In addition, PUCCHs carrying different UCI types may also overlap in the time domain. In the Rel-15 phase of 5G NR, the simultaneous transmission of a plurality of PUCCHs overlapping with to each other on the same carrier are not supported. If a plurality of PUCCHs overlap, whether the pre-defined time condition is met is determined for the first symbol in firstly initialized channel of overlapped PUCCH. For a plurality of overlapped PUCCHs or overlapped PUCCH and PUSCH, if there are a plurality of channels corresponding to the parameter value, or when there are a plurality of channels corresponding to the parameter value and the parameter values used to determine the time value and corresponding to the plurality of channels are different, and the terminal and the base station may cause incorrect scheduling or incorrect transmission due to different understandings of the parameters used to determine the time value.

In the embodiment of the present disclosure, when there are a plurality of channels corresponding to parameter values, or when there are a plurality of channels corresponding to the parameter values and the parameter values corresponding to the plurality of channels are different, the time value is determined according to a parameter value and corresponding to each of the plurality of channels; or, the time value is determined according to parameter values corresponding to the part of the channels in the plurality of channels; or, the time value is determined according to the part of parameter values corresponding to the plurality of channels. This embodiment provides a method used to determine the time value used to determine the time condition when the PUCCH and the PUSCH overlap, or when a plurality of PUCCHs overlap, thereby avoiding incorrect scheduling or incorrect transmission caused by the terminal and the base station due to different understandings of the parameters used to determine the time value.

Step 92: sending downlink transmission to the terminal, wherein a time condition determined based on the time value is met between the downlink transmission and a first symbol of an earliest channel among the overlapped PUCCH and PUSCH or the overlapped PUCCHs.

After determining the time value used to determine the time condition, the base station sends the downlink transmission to the terminal based on the time value, wherein the time condition determined based on the time value is met between the downlink transmission and the first symbol.

In the embodiments of the present disclosure, when there are overlapped PUCCH and PUSCH or a plurality of overlapped PUCCHs, the time value is determined according to the parameter values corresponding to each channel or part of the plurality of channels or according to part of the parameter values corresponding to the plurality of channels, and the method used to determine the time value used to determine the time condition is given, thereby avoiding incorrect scheduling or incorrect transmission caused by the terminal and the base station due to different understandings of the parameters used to determine the time value and improving the transmission efficiency of the system.

Specifically, the step 91 includes: if there are a plurality of downlink channels for which the hybrid automatic repeat request acknowledges HARQ-ACKS needs to be transmitted on the same PUCCH, or if there are a plurality of downlink channels for which the hybrid automatic repeat request acknowledges HARQ-ACKS needs to be transmitted on the same PUSCH and the first set of parameter values corresponding to the plurality of downlink channels are different, the first time value is determined according to the first set of parameter values corresponding to each of the plurality of downlink channels or according to the first set of parameter values corresponding to part of the plurality of downlink channels or according to part of the first set of parameter values corresponding to the plurality of downlink channels.

Wherein, the downlink channel is a physical downlink shared channel PDSCH and/or semi-persistent scheduling (SPS) PDSCH release.

When the downlink channel is the PDSCH, the first set of parameter values includes a first parameter value and/or a second parameter value and/or a third parameter value, and the first parameter value is determined according to a mapping type and/or a transmission duration of the PDSCH, the second parameter value is determined according to whether the Downlink Control Information (DCI) scheduling the PDSCH indicates the bandwidth part (BWP) switching, and the third parameter value is determined according to a processing capability of the terminal and a reference subcarrier spacing; wherein the reference subcarrier spacing is the smallest subcarrier spacing among PDSCH and overlapped uplink channels (such as PUCCH, or PUCCH and PUSCH). Optionally, when the downlink channel is the PDSCH, the first parameter used to determine the first time value is $d_{1,1}$, and the second parameter used to determine the first time value is $d_{1,2}$, and the third parameter used to determine the first time value is $N_1$.

When the downlink channel is SPS PDSCH release, the parameter value used to determine the first time value includes a fourth parameter value, and the fourth parameter value is determined according to the subcarrier spacing of the physical downlink control channel PDCCH that provides the SPS PDSCH release and a processing capability of the terminal. Optionally, when the downlink channel is SPS PDSCH release, the fourth parameter used to determine the first time value is N.

In this embodiment, the plurality of downlink channels are transmitted on the same or different carriers. Optionally, the time value used for timeline condition adjustment includes the first time value. For a plurality of overlapped PUCCHs or the overlapped PUCCH and PUSCH, if there are a plurality of downlink channels for which the HARQ-ACKS needs to be transmitted on the same PUCCH, or if there are a plurality of downlink channels for which the HARQ-ACKS needs to be transmitted on the same PUCCH and the parameter values used to determine the first time value and corresponding to the plurality of downlink channels are different, the method used to determine the first time value include but are not limited to the following:

Mode 1: Determining the first time value according to the first set of parameter values corresponding to each of the plurality of downlink channels;

Mode 2: Determining the first time value according to the first set of parameter values corresponding to part of the plurality of downlink channels;

Mode 3: Determining the first time value according to part of the parameter values used to determine the first time value and corresponding to the plurality of downlink channels.

For the above-mentioned mode 1, the determining the first time value according to the first set of parameter values corresponding to each of the plurality of downlink channels includes:

determining the first time value corresponding to each downlink channel according to the first set of parameter values corresponding to each downlink channel;

since the downlink channel is PDSCH and/or SPS PDSCH release, when the downlink channel is PDSCH, the first set of parameter values corresponding to each downlink channel includes: the first parameter value and/or the second parameter value and/or the third parameter value; that is, the first time value corresponding to each PDSCH is determined according to the first parameter value and/or the second parameter value and/or the third parameter value corresponding to each PDSCH.

When the downlink channel is SPS PDSCH release, the first set of parameter values corresponding to each downlink channel includes: the fourth parameter value; that is, the first time value corresponding to each SPS PDSCH release is determined according to the fourth parameter value corresponding to each SPS PDSCH release.

Regarding the above method 1, the step 92 includes: sending a plurality of downlink channels to the terminal, wherein the first symbol is no before a symbol starting after the first time value corresponding to each downlink channel after the last symbol of each downlink channel.

In this embodiment, since the downlink channel is PDSCH and/or SPS PDSCH release, when the downlink channel is PDSCH, the time condition met by the first symbol is: the first symbol is not before a symbol starting after the first time value corresponding to each PDSCH after the last symbol of each PDSCH; when the downlink channel is SPS PDSCH release, the time condition met by the first symbol is: the first symbol is not before a symbol starting after the first time value corresponding to each SPS PDSCH release after the last symbol of each SPS PDSCH release.

For the second mode, the determining the first time value according to the first set of parameter values corresponding to part of the plurality of downlink channels includes: determining the first time value according to the first set of parameter values corresponding to a first downlink channel or a last downlink channel among the plurality of downlink channels or a downlink channel that can obtain the maximum first time value; wherein, the downlink channel that can obtain the maximum first time value is the downlink channel corresponding to the maximum first parameter value and/or second parameter value and/or third parameter value.

In this embodiment, the downlink channel is PDSCH and/or SPS PDSCH release. When the downlink channel is PDSCH, the first set of parameter values corresponding to part of the plurality of downlink channels includes: the first parameter value and/or the second parameter value and/or the third parameter value; that is, the first time value is determined according to the first parameter value and/or the second parameter value and/or the third parameter value corresponding to the part of PDSCHs.

When the downlink channel is SPS PDSCH release, the parameter values used to determine the first time value and corresponding to the plurality of downlink channels include: a fourth parameter value; that is, the first time value is determined according to the fourth parameter value corresponding to part of SPS PDSCH releases.

For the third mode, the determining the first time value according to part of parameter values used to determine the first time value and corresponding to the plurality of downlink channels includes at least one of the following:

Determining the first time value according to a maximum value of the first parameter values corresponding to the plurality of downlink channels;

Determining the first time value according to a maximum value of the second parameter values corresponding to the plurality of downlink channels;

Determining the first time value according to a maximum value of the third parameter values corresponding to the plurality of downlink channels;

Wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

In this embodiment, when the downlink channel is PDSCH, the first time value is determined according to the maximum value of the first parameter values corresponding to the plurality of PDSCHs, and/or the maximum value of the second parameter values corresponding to the plurality of PDSCHs, and/or the maximum value of the third parameter values corresponding to the plurality of PDSCHs.

Specifically, if a plurality of parameter values need to be used to determine the first time value at the same time, the maximum value of each parameter value needs to be selected to determine the first time value. For example, the first parameter value and the third parameter value need to be used to determine the first time value. The first time value is determined by using the maximum value of the first parameter values corresponding to the plurality of downlink channels and the maximum value of the third parameter values corresponding to the plurality of downlink channels. Of course, the maximum value of the first parameter values corresponding to the plurality of downlink channels is used to calculate the first time value. At this time, if other parameter values are required, the other parameter values may not be the maximum value.

When the downlink channel is the SPS PDSCH release, the first time value is determined according to the maximum value of the fourth parameter values corresponding to the plurality of SPS PDSCH releases.

When the downlink channel is PDSCH and SPS PDSCH release, the corresponding first time value is calculated according to the above-mentioned method for PDSCH and SPS PDSCH release respectively, wherein first time values corresponding to PDSCH and SPS PDSCH release are calculated separately, and the timeline condition adjustment based on the first time value is implemented for each channel.

For mode 2 and mode 3, the step 92 includes: sending the plurality of downlink channels to the terminal, wherein the first symbol is not before a symbol starting after the first time value after the last symbol of any one of the plurality of downlink channels.

In this embodiment, since the downlink channel is PDSCH and/or SPS PDSCH release, when the downlink channel is PDSCH, the time condition met by the first symbol is: the first symbol is not before a symbol starting after the first time value after the last symbol of any one of the plurality of PDSCHs.

When the downlink channel is SPS PDSCH release, the time condition met by the first symbol is: the first symbol is not before a symbol starting after the first time value after the last symbol of any one of the plurality of SPS PDSCH releases.

The method used to determine the first time value is described above in three modes. The specific embodiment of the method used to determine the first time value refers to the uplink transmission method applied to the terminal in the first and second embodiments, which are not repeated herein.

Specifically, the step 91 includes: when there are a plurality of PUSCHs overlapping with the PUCCH, or when there are a plurality of PUSCHs overlapping with the PUCCH and parameter values used to determine the second time value and corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs.

Wherein, the parameter value used to determine the second time value includes a fifth parameter value and/or a sixth parameter value and/or a seventh parameter value; the fifth parameter value is determined based on the demodulation reference signal DMRS configuration of the PUSCH; the sixth parameter value is determined according to whether the DCI scheduling the PUSCH indicates a BWP switching, the seventh parameter value is determined according to an update set of an aperiodic channel state information A-CSI report included in the PUSCH.

Optionally, the fifth parameter used to determine the second time value is $d_{2,1}$, and the sixth parameter used to determine the second time value is $d_{2,2}$, the seventh parameter used to determine the second time value is Z.

In this embodiment, the time value used to determine the time condition includes the second time value. When there are a plurality of PUSCHs overlapping with the PUCCH, or when there are a plurality of PUSCHs overlapping with the PUCCH and parameter values used to determine the second time value and corresponding to the plurality of PUSCHs are different, the method used to determine the second time value is implemented in but not limited to the following modes:

Mode 4: Determining the second time value according to the second set of parameter values corresponding to each PUSCH of the plurality of PUSCHs;

Mode 5: Determining the second time value according to the second set of parameter values corresponding to part of the plurality of PUSCHs;

Mode 6: Determining the second time value according to part of the parameter values used to determine the second time value and corresponding to the plurality of PUSCHs.

With regard to the fourth mode, the determining the second time value according to the second set of parameter values corresponding to each PUSCH of the plurality of PUSCHs includes: determining the second time value corresponding to each PUSCH according to the second set of parameter values corresponding to each PUSCH.

With respect to the fourth manner above, the step 92 includes: sending each PDCCH in the first PDCCH set to the terminal, wherein the first symbol is not before a symbol starting after the second time value corresponding to each PUSCH after the last symbol of any PDCCH in the first PDCCH set, wherein the first PDCCH set includes at least one of a PDCCH for scheduling PDSCH or SPS PDSCH release that requires HARQ-ACKS feedback on the PUCCH, or a PDCCH for scheduling the PUSCH.

In this embodiment, for the case that a plurality of PUSCHs overlap the PUCCH, the first PDCCH set includes the PDCCH for scheduling the PUSCH, and the PDCCH for scheduling the PDSCH or SPS PDSCH release that requires HARQ-ACKS transmission on the PUCCH; for the case that a plurality of PUCCHs overlap, the first PDCCH set includes a PDCCH for scheduling a PDSCH or SPS PDSCH release that requires HARQ-ACKS transmission on the PUCCH.

For the fifth mode, the determining the second time value according to the second set of parameter values corresponding to part of the PUSCHs in the plurality of PUSCHs further includes: determining the second time value according to the second set of parameter values corresponding to the first PUSCH or the last PUSCH among the plurality of PUSCHs or the PUSCH that can obtain the maximum second time value; wherein the PUSCH that can obtain the maximum second time value is the PUSCH corresponding to the maximum fifth parameter value and/or sixth parameter value and/or seventh parameter value.

For the sixth mode, the determining the second time value according to part of the parameter values used to determine the second time value and corresponding to the plurality of PUSCHs includes at least one of the following:

Determining the second time value according to the maximum value of fifth parameter values respectively corresponding to the plurality of PUSCHs;

Determining the second time value according to the maximum value of sixth parameter values respectively corresponding to the plurality of PUSCHs;

Determining the second time value according to the maximum value of seventh parameter values respectively corresponding to the plurality of PUSCHs;

Wherein, the first PUSCH corresponding to the maximum value of the fifth parameter values, the second PUSCH corresponding to the maximum value of the sixth parameter values, and the third PUSCH corresponding to the maximum value of the seventh parameter values are same PUSCH or different PUSCHs.

In this embodiment, the maximum value of the fifth parameter values corresponding to a plurality of PUSCHs, and/or the maximum value of the sixth parameter values corresponding to the plurality of PUSCHs, and/or the maximum value of the seventh parameter values respectively corresponding to each PUSCH are used to determine the first time value.

Specifically, if a plurality of parameter values need to be used to determine the second time value at the same time, the maximum value of each parameter value needs to be selected to determine the second time value. For example, for PUSCH that does not carry A-CSI, the fifth parameter value and the sixth parameter value are used to determine the second time value, then the maximum value of the fifth parameter values corresponding to a plurality of PUSCHs and the maximum value of the sixth parameter values corresponding to a plurality of PUSCHs are used to determine the second time value; of course; only the maximum value of the sixth parameter values (or the fifth parameter values) corresponding to a plurality of PUSCHs is used to calculate the second time value. At this time, if other parameter values are required, the other parameter values may not be the maximum value; for another example, for the PUSCH carrying A-CSI, the sixth parameter value and the seventh parameter value need to be used to determine the second time value, then the maximum value of the sixth parameter values corresponding to a plurality of PUSCHs and the maximum value of the seventh parameter values corresponding to a plurality of PUSCH are used to determine the second time value; of course, it is also possible to use only the maximum value of the sixth parameter values (or the seventh parameter values) corresponding to a plurality of PUSCHs to calculate the second time value. If other parameter values are needed at this time, the other parameter values may not be the maximum value.

For the mode 5 or 6, the step 92 includes: sending each PDCCH in the first PDCCH set to the terminal, wherein the first symbol is no before a symbol starting after the second time value after the last symbol of any PDCCH in the first PDCCH set, wherein the first PDCCH set includes a PDCCH for scheduling a PDSCH or SPS PDCSH release that requires HARQ-ACKS feedback on the PUCCH, and a PDCCH for scheduling the PUSCH.

The method used to determine the second time value is described above in three modes. The specific embodiment of the method used to determine the second time value refers to the uplink transmission method applied to the terminal in the third or fourth embodiment, which is not repeated herein.

In the embodiments of the present disclosure, when there are overlapped PUCCH and PUSCH or a plurality of overlapped PUCCHs, the time value is determined according to the parameter value and corresponding to each channel or part of the plurality of channels or part of the parameter values used to determine the time value and corresponding to the plurality of channels, and the method used to determine the time value used to determine the time condition is given, thereby avoiding incorrect scheduling or incorrect transmission caused by the terminal and the base station due to different understandings of the parameters used to determine the time value and improving the transmission efficiency of the system.

Figure 10:
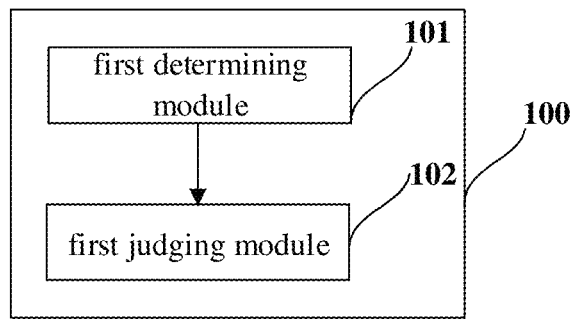
FIG. 10 shows a structural block diagram of a terminal according to some embodiments of the present disclosure.

As shown in FIG. 10, an embodiment of the present disclosure further provides a terminal, and the terminal 100 includes: a first determining module 101, configured to, when there are overlapped physical uplink control channel (PUCCH) and physical uplink shared channel (PUSCH), or there are overlapped PUCCHs, if there are a plurality of channels corresponding to parameter values used to determine a time value, or if there are the plurality of channel corresponding to parameter values and the parameter values used to determine the time value corresponding to the plurality of channels are different, determine the time value according to a parameter value corresponding to each of the plurality of channels or according to parameter values corresponding to part of the plurality of channels or according to part of parameter values corresponding to the plurality of channels; a first judging module 102, configured to perform a timeline condition adjustment on a first symbol of an earliest channel among the overlapped PUCCH and PUSCH or the plurality of overlapped PUCCHs based on the time value.

Optionally, the first determining module 101 includes: a first determining unit, configured to, if there are a plurality of downlink channels for which the hybrid automatic repeat request acknowledges HARQ-ACKS needs to be transmitted on the same PUCCH, or if there are a plurality of downlink channels for which the hybrid automatic repeat request acknowledges HARQ-ACKS needs to be transmitted on the same PUCCH and the first set of parameter values corresponding to the plurality of downlink channels are different, determine the first time value according to the first set of parameter values corresponding to each of the plurality of downlink channels or according to the first set of parameter values corresponding to part of the plurality of downlink channels or according to part of the first set of parameter values corresponding to the plurality of downlink channels;

Wherein, the downlink channel is a physical downlink shared channel PDSCH and/or semi-persistent scheduling SPS PDSCH release;

When the downlink channel is the PDSCH, the first set of parameter values includes a first parameter value and/or a second parameter value and/or a third parameter value, and the first parameter value is determined according to a mapping type and/or a transmission duration of the PDSCH, the second parameter value is determined according to whether the Downlink Control Information (DCI) scheduling the PDSCH indicates the bandwidth part (BWP) switching, and the third parameter value is determined according to a processing capability of the terminal and a reference subcarrier spacing.

When the downlink channel is SPS PDSCH release, the parameter value used to determine the first time value includes a fourth parameter value, and the fourth parameter value is determined according to the subcarrier spacing of the physical downlink control channel PDCCH that provides the SPS PDSCH release and a processing capability of the terminal.

Optionally, the first determining unit is specifically configured to: determine the first time value corresponding to each downlink channel according to the first set of parameter values corresponding to each downlink channel;

The first judging module 102 is specifically configured to: determine that the first symbol is not before a symbol starting after the first time value corresponding to each downlink channel after the last symbol of each downlink channel.

Optionally, the first determining unit is specifically configured to: determine the first time value according to the first set of parameter values corresponding to a first downlink channel or a last downlink channel among the plurality of downlink channels or a downlink channel that can obtain the maximum first time value; wherein, the downlink channel that can obtain the maximum first time value is the downlink channel corresponding to the maximum first parameter value and/or second parameter value and/or third parameter value.

Optionally, the first determining unit is specifically configured to:
determine the first time value according to a maximum value of the first parameter values corresponding to the plurality of downlink channels;

determine the first time value according to a maximum value of the second parameter values corresponding to the plurality of downlink channels;

determine the first time value according to a maximum value of the third parameter values corresponding to the plurality of downlink channels;

Wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels Optionally, the first determination module 102 is specifically configured to: determine that the first symbol is not before a symbol starting after the first time value after the last symbol of any one of the plurality of downlink channels.

Optionally, the first determining module 101 includes:

a second determining unit, configured to: when there are a plurality of PUSCHs overlapping with the PUCCH, or when there are a plurality of PUSCHs overlapping with the PUCCH and parameter values used to determine the second time value and corresponding to the plurality of PUSCHs are different, determine a second time value according to second set of parameter values corresponding to each of the plurality of PUSCHs, or according to second set of parameter values corresponding to part of the plurality of PUSCHs, or according to part of second set of parameter values corresponding to the plurality of PUSCHs.

Wherein, the parameter value used to determine the second time value includes a fifth parameter value and/or a sixth parameter value and/or a seventh parameter value; the fifth parameter value is determined based on the demodulation reference signal DMRS configuration of the PUSCH; the sixth parameter value is determined according to whether the DCI scheduling the PUSCH indicates a BWP switching; the seventh parameter value is determined according to an update set of an aperiodic channel state information A-CSI report included in the PUSCH.

Optionally, the second determining unit is specifically configured to: determine the second time value corresponding to each PUSCH according to the second set of parameter values corresponding to each PUSCH.

When the timeline condition adjustment is performed for the first symbol of the earliest channel of the overlapped PUCCH and PUSCH or the overlapped PUCCHs based on the time value, the first determination module is configured to: determine that the first symbol is not before a symbol starting after the second time value after the last symbol of any PDCCH in the first PDCCH set, wherein the first PDCCH set includes the PDCCH scheduling the PDSCH or SPS PDSCH release that requires HARQ-ACKS feedback on the PUCCH, and the PDCCH for scheduling the PUSCH.

Optionally, the second determining unit is specifically configured to: determine the second time value according to the second set of parameter values corresponding to the first PUSCH or the last PUSCH among the plurality of PUSCHs or the PUSCH that can obtain the maximum second time value;

Wherein, the PUSCH that can obtain the maximum second time value is the PUSCH corresponding to the maximum fifth parameter value and/or sixth parameter value and/or seventh parameter value.

Optionally, the second determining unit is specifically configured to:

determine the second time value according to the maximum value of the fifth parameter values respectively corresponding to the plurality of PUSCHs;

determine the second time value according to the maximum value of the sixth parameter values respectively corresponding to the plurality of PUSCHs;

determine the second time value according to the maximum value of the seventh parameter values respectively corresponding to the plurality of PUSCHs;

Wherein, the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs.

Optionally, the first determination module 102 is specifically configured to: determine that the first symbol is not before a symbol starting after the second time value after the last symbol of any PDCCH in the first PDCCH set, wherein the first PDCCH set includes the PDCCH scheduling the PDSCH or SPS PDSCH release that requires HARQ-ACKS feedback on the PUCCH, and the PDCCH for scheduling the PUSCH.

The terminal of the present disclosure corresponds to the foregoing embodiment of the uplink channel transmission method applied to the terminal. All the implementation in the method embodiment are applicable to the embodiment of the terminal, and the same technical effect can also be achieved.

Figure 11:
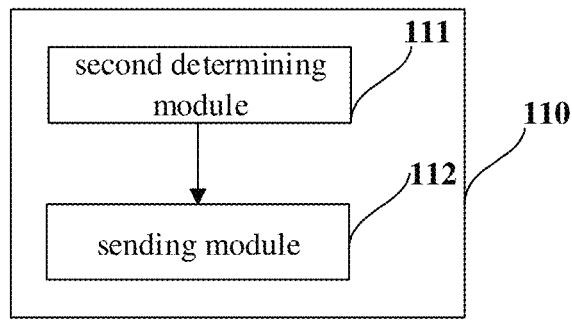
FIG. 11 shows a structural block diagram of a base station according to some embodiments of the present disclosure.

As shown in FIG. 11, an embodiment of the present disclosure further provides a base station, and the terminal 110 includes: a second determining module 111, configured to, when there are overlapped physical uplink control channel (PUCCH) and physical uplink shared channel (PUSCH), or there are overlapped PUCCHs, if there are a plurality of channels corresponding to parameter values used to determine a time value, or if there are the plurality of channel corresponding to parameter values and the parameter values used to determine the time value corresponding to the plurality of channels are different, determine the time value according to a parameter value corresponding to each of the plurality of channels or according to parameter values corresponding to part of the plurality of channels or according to part of parameter values corresponding to the plurality of channels; a sending module 112, configured to send downlink transmission to the terminal, wherein a time condition determined based on the time value is met between the downlink transmission and a first symbol of an earliest channel among the overlapped PUCCH and PUSCH or the overlapped PUCCHs.

Optionally, the second determining module 111 includes: a third determining unit, configured to, if there are a plurality of downlink channels for which the hybrid automatic repeat request acknowledges HARQ-ACKS needs to be transmitted on the same PUCCH, or if there are a plurality of downlink channels for which the hybrid automatic repeat request acknowledges HARQ-ACKS needs to be transmitted on the same PUCCH and the first set of parameter values corresponding to the plurality of downlink channels are different, determine the first time value according to the first set of parameter values corresponding to each of the plurality of downlink channels or according to the first set of parameter values corresponding to part of the plurality of downlink channels or according to part of the first set of parameter values corresponding to the plurality of downlink channels;

Wherein, the downlink channel is a physical downlink shared channel PDSCH and/or semi-persistent scheduling (SPS) PDSCH release.

When the downlink channel is the PDSCH, the first set of parameter values includes a first parameter value and/or a second parameter value and/or a third parameter value, and the first parameter value is determined according to a mapping type and/or a transmission duration of the PDSCH, the second parameter value is determined according to whether the Downlink Control Information (DCI) scheduling the PDSCH indicates the bandwidth part (BWP) switching, and the third parameter value is determined according to a processing capability of the terminal and a reference subcarrier spacing;

When the downlink channel is SPS PDSCH release, the parameter value used to determine the first time value includes a fourth parameter value, and the fourth parameter value is determined according to the subcarrier spacing of the physical downlink control channel PDCCH that provides the SPS PDSCH release and a processing capability of the terminal.

Optionally, the third determining unit is specifically configured to: determine the first time value corresponding to each downlink channel according to the first set of parameter values corresponding to each downlink channel;

The sending module is specifically configured to: send a plurality of downlink channels to the terminal, wherein the first symbol is no before a symbol starting after the first time value corresponding to each downlink channel after the last symbol of each downlink channel.

Optionally, the third determining unit is specifically configured to:

determine the first time value according to the first set of parameter values corresponding to a first downlink channel or a last downlink channel among the plurality of downlink channels or a downlink channel that can obtain the maximum first time value; wherein the downlink channel that can obtain the maximum first time value is the downlink channel corresponding to the maximum first parameter value and/or second parameter value and/or third parameter value.

Optionally, the third determining unit is specifically configured to:

Determine the first time value according to a maximum value of the first parameter values corresponding to the plurality of downlink channels;

Determine the first time value according to a maximum value of the second parameter values corresponding to the plurality of downlink channels;

Determine the first time value according to a maximum value of the third parameter values corresponding to the plurality of downlink channels;

Wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

Optionally, the sending module 112 is specifically configured to: send the plurality of downlink channels to the terminal, wherein the first symbol is not before a symbol starting after the first time value after the last symbol of any one of the plurality of downlink channels.

Optionally, the second determining module 11 includes: a fourth determining unit, configured to: when there are a plurality of PUSCHs overlapping with the PUCCH, or when there are a plurality of PUSCHs overlapping with the PUCCH and parameter values used to determine the second time value and corresponding to the plurality of PUSCHs are different, determine a second time value according to second set of parameter values corresponding to each of the plurality of PUSCHs, or according to second set of parameter values corresponding to part of the plurality of PUSCHs, or according to part of second set of parameter values corresponding to the plurality of PUSCHs;

Wherein, the parameter value used to determine the second time value includes a fifth parameter value and/or a sixth parameter value and/or a seventh parameter value; the fifth parameter value is determined based on the demodulation reference signal DMRS configuration of the PUSCH; the sixth parameter value is determined according to whether the DCI scheduling the PUSCH indicates a BWP switching; the seventh parameter value is determined according to an update set of an aperiodic channel state information A-CSI report included in the PUSCH.

Optionally, the fourth determining unit is specifically configured to:

determine the second time value corresponding to each PUSCH according to the second set of parameter values corresponding to each PUSCH;

The sending module 112 is specifically configured to: send each PDCCH in the first PDCCH set to the terminal, wherein the first symbol is not before a symbol starting after the second time value corresponding to each PUSCH after the last symbol of any PDCCH in the first PDCCH set, wherein the first PDCCH set includes at least one of a PDCCH for scheduling PDSCH or SPS PDSCH release that requires HARQ-ACKS feedback on the PUCCH, or a PDCCH for scheduling the PUSCH.

Optionally, the fourth determining unit is specifically configured to:

determining the second time value according to the second set of parameter values corresponding to the first PUSCH or the last PUSCH among the plurality of PUSCHs or the PUSCH that can obtain the maximum second time value; wherein the PUSCH that can obtain the maximum second time value is the PUSCH corresponding to the maximum fifth parameter value and/or sixth parameter value and/or seventh parameter value.

Optionally, the fourth determining unit is specifically configured to:

Determine the second time value according to the maximum value of fifth parameter values respectively corresponding to the plurality of PUSCHs;

Determine the second time value according to the maximum value of sixth parameter values respectively corresponding to the plurality of PUSCHs;

Determine the second time value according to the maximum value of seventh parameter values respectively corresponding to the plurality of PUSCHs;

Wherein, the first PUSCH corresponding to the maximum value of the fifth parameter values, the second PUSCH corresponding to the maximum value of the sixth parameter values, and the third PUSCH corresponding to the maximum value of the seventh parameter values are same PUSCH or different PUSCHs.

Optionally, the sending module 112 is specifically configured to:

send each PDCCH in the first PDCCH set to the terminal, wherein the first symbol is no before a symbol starting after the second time value after the last symbol of any PDCCH in the first PDCCH set, wherein the first PDCCH set includes a PDCCH for scheduling a PDSCH or SPS PDCSH release that requires HARQ-ACKS feedback on the PUCCH, and a PDCCH for scheduling the PUSCH.

The base station of the present disclosure corresponds to the foregoing embodiment of the uplink channel transmission method applied to the base station, and all the implementation in the method embodiment are applicable to the embodiment of the base station, and the same technical effect can also be achieved.

Figure 12:
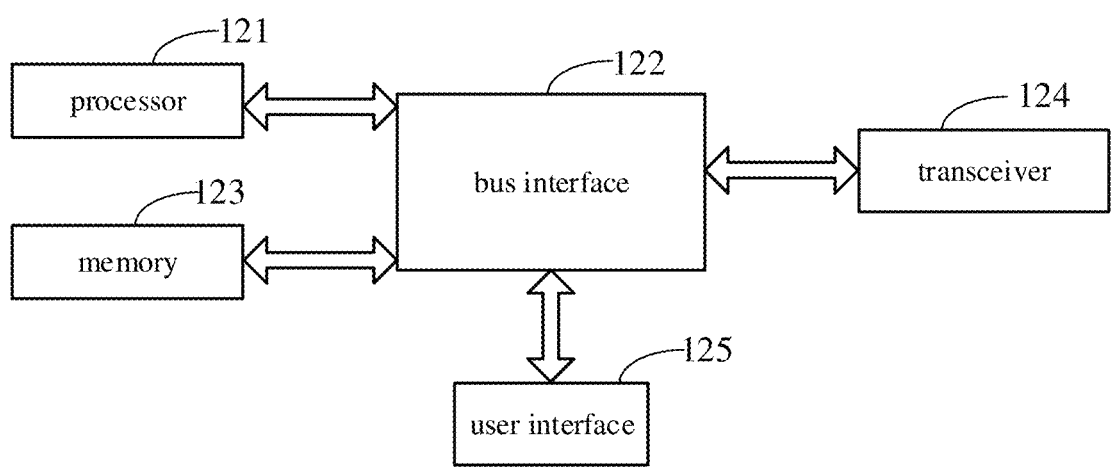
FIG. 12 shows a schematic diagram of the structure of the terminal according to some embodiments of the present disclosure.

As shown in FIG. 12, some embodiments of the present disclosure also provide a terminal, including a transceiver 124, a memory 123, a processor 121, and a program stored in the memory and executed by the processor.

The processor 121 and the memory 123 are connected to the processor 121 through a bus interface 122, the memory 123 is used to store programs and data used by the processor 121 when performing operations, when the processor 121 calls and executes the programs and data stored in the memory 123, the following process is executed.

Wherein, the transceiver 124 is connected to the bus interface 122, and is used to receive and send data under the control of the processor 121. Specifically, the processor 121 executes the program to implement the following steps:

when there are overlapped physical uplink control channel (PUCCH) and physical uplink shared channel (PUSCH), or there are overlapped PUCCHs, if there are a plurality of channels corresponding to parameter values used to determine a time value, or if there are the plurality of channel corresponding to parameter values and the parameter values used to determine the time value corresponding to the plurality of channels are different, determining the time value according to a parameter value corresponding to each of the plurality of channels or according to parameter values corresponding to part of the plurality of channels or according to part of parameter values corresponding to the plurality of channels;

performing a timeline condition adjustment on a first symbol of an earliest channel among the overlapped PUCCH and PUSCH or the plurality of overlapped PUCCHs based on the time value.

Optionally, the processor 121 executes the program to implement the following steps:
if there are a plurality of downlink channels for which the hybrid automatic repeat request acknowledges HARQ-ACKS needs to be transmitted on the same PUCCH, or if there are a plurality of downlink channels for which the hybrid automatic repeat request acknowledges HARQ-ACKS needs to be transmitted on the same PUCCH and the first set of parameter values corresponding to the plurality of downlink channels are different, determining the first time value according to the first set of parameter values corresponding to each of the plurality of downlink channels or according to the first set of parameter values corresponding to part of the plurality of downlink channels or according to part of the first set of parameter values corresponding to the plurality of downlink channels;

Wherein, the downlink channel is a physical downlink shared channel PDSCH and/or semi-persistent scheduling SPS PDSCH release;

When the downlink channel is the PDSCH, the first set of parameter values includes a first parameter value and/or a second parameter value and/or a third parameter value, and the first parameter value is determined according to a mapping type and/or a transmission duration of the PDSCH, the second parameter value is determined according to whether the Downlink Control Information (DCI) scheduling the PDSCH indicates the bandwidth part (BWP) switching, and the third parameter value is determined according to a processing capability of the terminal and a reference subcarrier spacing.

When the downlink channel is SPS PDSCH release, the parameter value used to determine the first time value includes a fourth parameter value, and the fourth parameter value is determined according to the subcarrier spacing of the physical downlink control channel PDCCH that provides the SPS PDSCH release and a processing capability of the terminal.

Optionally, the processor 121 executes the program to implement the following steps:
determining the first time value corresponding to each downlink channel according to the first set of parameter values corresponding to each downlink channel;

When the timeline condition adjustment is implemented for the first symbol of the earliest channel among the overlapped PUCCH and PUSCH or a plurality of overlapped PUCCHs, the processor implements the following steps:
determining that the first symbol is not before a symbol starting after the first time value corresponding to each downlink channel after the last symbol of each downlink channel.

Optionally, the processor 121 executes the program to implement the following steps:
determining the first time value according to the first set of parameter values corresponding to a first downlink channel or a last downlink channel among the plurality of downlink channels or a downlink channel that can obtain the maximum first time value; wherein, the downlink channel that can obtain the maximum first time value is the downlink channel corresponding to the maximum first parameter value and/or second parameter value and/or third parameter value.

Optionally, the processor 121 executes the program to implement at least one of the following steps:
determining the first time value according to a maximum value of the first parameter values corresponding to the plurality of downlink channels;
determining the first time value according to a maximum value of the second parameter values corresponding to the plurality of downlink channels;
determining the first time value according to a maximum value of the third parameter values corresponding to the plurality of downlink channels;
Wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

Optionally, the processor 121 executes the program to implement the following steps:
determining that the first symbol is not before a symbol starting after the first time value after the last symbol of any one of the plurality of downlink channels.

Optionally, the processor 121 executes the program to implement the following steps:
when there are a plurality of PUSCHs overlapping with the PUCCH, or when there are a plurality of PUSCHs overlapping with the PUCCH and parameter values used to determine the second time value and corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs.

Wherein, the parameter value used to determine the second time value includes a fifth parameter value and/or a sixth parameter value and/or a seventh parameter value; the fifth parameter value is determined based on the demodulation reference signal DMRS configuration of the PUSCH; the sixth parameter value is determined according to whether the DCI scheduling the PUSCH indicates a BWP switching; the seventh parameter value is determined according to an update set of an aperiodic channel state information A-CSI report included in the PUSCH.

Optionally, the processor 121 executes the program to implement the following steps:

determining the second time value corresponding to each PUSCH according to the second set of parameter values corresponding to each PUSCH.

When the timeline condition adjustment is performed for the first symbol of the earliest channel of the overlapped PUCCH and PUSCH or the overlapped PUCCHs based on the time value, the processor implements the following steps:

determining that the first symbol is not before a symbol starting after the second time value after the last symbol of any PDCCH in the first PDCCH set, wherein the first PDCCH set includes the PDCCH scheduling the PDSCH or SPS PDSCH release that requires HARQ-ACKS feedback on the PUCCH, and the PDCCH for scheduling the PUSCH.

Optionally, the processor 121 executes the program to implement the following steps:

determining the second time value according to the second set of parameter values corresponding to the first PUSCH or the last PUSCH among the plurality of PUSCHs or the PUSCH that can obtain the maximum second time value;

Wherein, the PUSCH that can obtain the maximum second time value is the PUSCH corresponding to the maximum fifth parameter value and/or sixth parameter value and/or seventh parameter value.

Optionally, the processor executes the program to implement at least one of the following steps:

determining the second time value according to the maximum value of the fifth parameter values respectively corresponding to the plurality of PUSCHs;

determining the second time value according to the maximum value of the sixth parameter values respectively corresponding to the plurality of PUSCHs;

determining the second time value according to the maximum value of the seventh parameter values respectively corresponding to the plurality of PUSCHs;

Wherein, the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs.

Optionally, the processor 121 executes the program to implement the following steps:

determining that the first symbol is not before a symbol starting after the second time value after the last symbol of any PDCCH in the first PDCCH set, wherein the first PDCCH set includes the PDCCH scheduling the PDSCH or SPS PDSCH release that requires HARQ-ACKS feedback on the PUCCH, and the PDCCH for scheduling the PUSCH.

It should be noted that in FIG. 12, the bus architecture may include any number of interconnected buses and bridges, and specifically various circuits of one or more processors represented by the processor 121 and the memory represented by the memory 123 are linked together. The bus architecture can also link various other circuits such as peripheral devices, voltage regulators, power management circuits, etc., which are all known in the art, and therefore, no further description will be given herein. The bus interface provides the interface. The transceiver 124 may be a plurality of elements, including a transmitter and a transceiver, and provide a unit for communicating with various other devices on a transmission medium. For different terminals, the user interface 125 may also be an interface capable of connecting required device externally and internally. The connected device includes but not limited to a keypad, a display, a speaker, a microphone, a joystick, and the like. The processor 121 is responsible for managing the bus architecture and general processing, and the memory 123 can store data used by the processor 121 when performing operations.

Those skilled in the art can understand that all or part of the steps of the above-mentioned embodiments can be implemented by hardware, or by a related hardware instructed by a computer program. The computer program includes instructions for performing part or all of the steps of the above-mentioned method; and the computer program can be stored in a readable storage medium, which can be any form of storage medium.

Some embodiments of the present disclosure also provide a base station, including; a transceiver, a memory, a processor, and a program stored in the memory and executed by the processor. The processor executes the program to implement the above-mentioned uplink channel transmission method applied to the base station.

Figure 13:
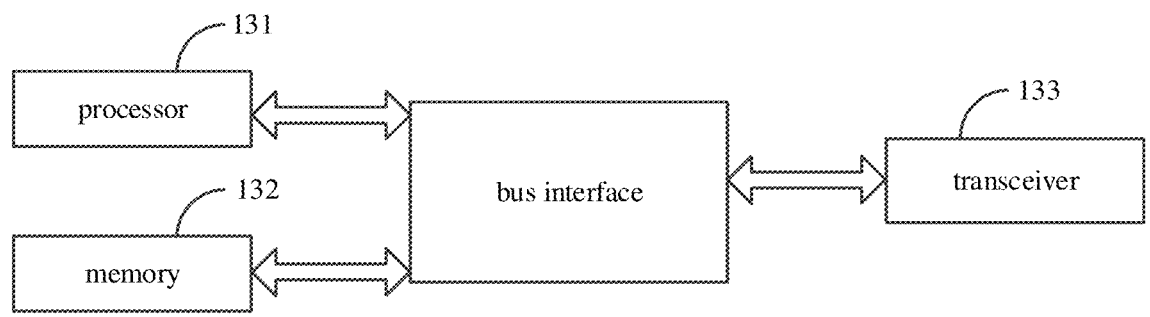
FIG. 13 shows a schematic diagram of the structure of the base station according to some embodiments of the present disclosure.

As shown in FIG. 13, the base station includes: a processor 131, configured to read a program in the memory 132 and execute the following process:

when there are overlapped physical uplink control channel (PUCCH) and physical uplink shared channel (PUSCH), or there are overlapped PUCCHs, if there are a plurality of channels corresponding to parameter values used to determine a time value, or if there are the plurality of channel corresponding to parameter values and the parameter values used to determine the time value corresponding to the plurality of channels are different, determining the time value according to a parameter value corresponding to each of the plurality of channels or according to parameter values corresponding to part of the plurality of channels or according to part of parameter values corresponding to the plurality of channels; and sending downlink transmission to the terminal, wherein a time condition determined based on the time value is met between the downlink transmission and a first symbol of an earliest channel among the overlapped PUCCH and PUSCH or the overlapped PUCCHs.

The transceiver 133 is used to receive and send data under the control of the processor 131.

Optionally, the processor 131 executes the program to implement the following steps:

if there are a plurality of downlink channels for which the hybrid automatic repeat request acknowledges HARQ-ACKS needs to be transmitted on the same PUCCH, or if there are a plurality of downlink channels for which the hybrid automatic repeat request acknowledges HARQ-ACKS needs to be transmitted on the same PUCCH and the first set of parameter values corresponding to the plurality of downlink channels are different, determining the first time value according to the first set of parameter values corresponding to each of the plurality of downlink channels or according to the first set of parameter values corresponding to part of the plurality of downlink channels or according to part of the first set of parameter values corresponding to the plurality of downlink channels;

Wherein, the downlink channel is a physical downlink shared channel PDSCH and/or semi-persistent scheduling (SPS) PDSCH release.

When the downlink channel is the PDSCH, the first set of parameter values includes a first parameter value and/or a second parameter value and/or a third parameter value, and the first parameter value is determined according to a mapping type and/or a transmission duration of the PDSCH, the second parameter value is determined according to whether the Downlink Control Information (DCI) scheduling the PDSCH indicates the bandwidth part (BWP) switching, and the third parameter value is determined according to a processing capability of the terminal and a reference subcarrier spacing;

When the downlink channel is SPS PDSCH release, the parameter value used to determine the first time value includes a fourth parameter value, and the fourth parameter value is determined according to the subcarrier spacing of the physical downlink control channel PDCCH that provides the SPS PDSCH release and a processing capability of the terminal.

Optionally, the processor 131 executes the program to implement the following steps:

determining the first time value corresponding to each downlink channel according to the first set of parameter values corresponding to each downlink channel;

sending a downlink transmission to a terminal, wherein the time condition determined based on the time value is met between the downlink transmission and the first symbol of the earliest channel among the overlapped PUCCH and PUSCH or the plurality of overlapped PUCCHs including:

sending a plurality of downlink channels to the terminal, wherein the first symbol is no before a symbol starting after the first time value corresponding to each downlink channel after the last symbol of each downlink channel.

Optionally, the processor 131 executes the program to implement the following steps:

determining the first time value according to the first set of parameter values corresponding to a first downlink channel or a last downlink channel among the plurality of downlink channels or a downlink channel that can obtain the maximum first time value; wherein the downlink channel that can obtain the maximum first time value is the downlink channel corresponding to the maximum first parameter value and/or second parameter value and/or third parameter value.

Optionally, the processor 131 executes the program to implement at least one of the following steps:

Determining the first time value according to a maximum value of the first parameter values corresponding to the plurality of downlink channels;

Determining the first time value according to a maximum value of the second parameter values corresponding to the plurality of downlink channels;

Determining the first time value according to a maximum value of the third parameter values corresponding to the plurality of downlink channels;

Wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels.

Optionally, the processor 131 executes the program to implement the following steps:

sending the plurality of downlink channels to the terminal, wherein the first symbol is not before a symbol starting after the first time value after the last symbol of any one of the plurality of downlink channels.

Optionally, the processor 131 executes the program to implement the following steps:

when there are a plurality of PUSCHs overlapping with the PUCCH, or when there are a plurality of PUSCHs overlapping with the PUCCH and parameter values used to determine the second time value and corresponding to the plurality of PUSCHs are different, determining a second time value according to second set of parameter values corresponding to each of the plurality of PUSCHs, or according to second set of parameter values corresponding to part of the plurality of PUSCHs, or according to part of second set of parameter values corresponding to the plurality of PUSCHs;

Wherein, the parameter value used to determine the second time value includes a fifth parameter value and/or a sixth parameter value and/or a seventh parameter value; the fifth parameter value is determined based on the demodulation reference signal DMRS configuration of the PUSCH; the sixth parameter value is determined according to whether the DCI scheduling the PUSCH indicates a BWP switching; the seventh parameter value is determined according to an update set of an aperiodic channel state information A-CSI report included in the PUSCH.

Optionally, the processor 131 executes the program to implement the following steps:

determining the second time value corresponding to each PUSCH according to the second set of parameter values corresponding to each PUSCH;

sending a downlink transmission to a terminal, wherein the time condition determined based on the time value is met between the downlink transmission and the first symbol of the earliest channel among the overlapped PUCCH and PUSCH or the plurality of overlapped PUCCHs including:

sending each PDCCH in the first PDCCH set to the terminal, wherein the first symbol is not before a symbol starting after the second time value corresponding to each PUSCH after the last symbol of any PDCCH in the first PDCCH set, wherein the first PDCCH set includes at least one of a PDCCH for scheduling PDSCH or SPS PDSCH release that requires HARQ-ACKS feedback on the PUCCH, or a PDCCH for scheduling the PUSCH.

Optionally, the processor 131 executes the program to implement the following steps:

determining the second time value according to the second set of parameter values corresponding to the first PUSCH or the last PUSCH among the plurality of PUSCHs or the PUSCH that can obtain the maximum second time value; wherein the PUSCH that can obtain the maximum second time value is the PUSCH corresponding to the maximum fifth parameter value and/or sixth parameter value and/or seventh parameter value.

Optionally, the processor 131 executes the program to implement at least one of the following steps:

Determining the second time value according to the maximum value of fifth parameter values respectively corresponding to the plurality of PUSCHs;

Determining the second time value according to the maximum value of sixth parameter values respectively corresponding to the plurality of PUSCHs;

Determining the second time value according to the maximum value of seventh parameter values respectively corresponding to the plurality of PUSCHs;

Wherein, the first PUSCH corresponding to the maximum value of the fifth parameter values, the second PUSCH corresponding to the maximum value of the sixth parameter values, and the third PUSCH corresponding to the maximum value of the seventh parameter values are same PUSCH or different PUSCHs.

Optionally, the processor 131 executes the program to implement the following steps:

sending each PDCCH in the first PDCCH set to the terminal, wherein the first symbol is no before a symbol starting after the second time value after the last symbol of any PDCCH in the first PDCCH set, wherein the first PDCCH set includes a PDCCH for scheduling a PDSCH or SPS PDCSH release that requires HARQ-ACKS feedback on the PUCCH, and a PDCCH for scheduling the PUSCH.

Wherein, in FIG. 13, the bus architecture may include any number of interconnected buses and bridges. Specifically, various circuits of one or more processors represented by the processor 131 and the memory represented by the memory 132 are linked together. The bus architecture can also link various other circuits such as peripheral devices, voltage regulators, power management circuits, etc., which are all known in the art, and therefore, no further description will be given herein. The bus interface provides the interface. The transceiver 133 may be a plurality of elements, that is, including a transmitter and a transceiver, and provide a unit for communicating with various other devices on the transmission medium. The processor 131 is responsible for managing the bus architecture and general processing, and the memory 132 can store data used by the processor 131 when performing operations.

Those skilled in the art can understand that all or part of the steps of the above-mentioned embodiments can be implemented by hardware, or by a hardware instructed by a computer program. The computer program includes instructions for performing part or all of the steps of the above-mentioned method and the computer program can be stored in a readable storage medium, which can be any form of storage medium.

Some embodiments of the present disclosure also provide a computer-readable storage medium on which a computer program is stored. When the computer program is executed by a processor, each process of the above-mentioned uplink channel transmission method is realized, and the same technical effect can be achieved, which is not repeated herein in order to avoid repetition. Wherein, the computer-readable storage medium may be, such as read-only memory (ROM), random access memory (RAM), magnetic disk, or optical disk, etc.

It can be understood that the embodiments described in the present disclosure may be implemented by hardware, software, firmware, middleware, microcode, or a combination thereof. For hardware implementation, modules, units, sub-modules, sub-units, etc. can be implemented in one or more application specific integrated circuits (ASIC), digital signal processors (DSP), digital signal processing equipment (DSP Device, DSPD), Programmable Logic Device (PLD), Field-Programmable Gate Array (FPGA), general-purpose processors, controllers, microcontrollers, microprocessors, other electronic units or combinations thereof that perform the functions described in the present disclosure.

For software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

Therefore, the purpose of the present disclosure can also be realized by running a program or a group of programs on any computing device. The computing device may be a well-known general-purpose device. Therefore, the purpose of the present disclosure can also be achieved only by providing a program product containing program code for implementing the method or device. That is, such a program product also constitutes the present disclosure, and a storage medium storing such a program product also constitutes the present disclosure. Obviously, the storage medium may be any well-known storage medium or any storage medium developed in the future. It should also be pointed out that in the device and method of the present disclosure, obviously, each component or each step can be decomposed and/or recombined. These decomposition and/or recombination should be regarded as equivalent solutions of the present disclosure. In addition, the steps of performing the above-mentioned series of processing can naturally be performed in chronological order in the disclosure, but do not necessarily need to be performed in chronological order. Some steps can be performed in parallel or independently of each other.

Those of ordinary skill in the art can understand that all or any of the steps or components of the method and device of the present disclosure can be used in any computing device (including a processor, storage medium, etc.) or a network of computing devices by using hardware, firmware, software, or a combination thereof. This can be achieved by those of ordinary skill in the art using their basic programming skills after reading the description of the present disclosure.

The above are optional implementations of the present disclosure. It should be pointed out that for those of ordinary skill in the art, several improvements and modifications can be made without departing from the principles of the present disclosure. These improvements and modifications should also be regarded as the protection scope of the present disclosure.

What is claimed is:

1. An uplink channel transmission method, applied to a terminal, comprising:

in response to that there are overlapped physical uplink control channel (PUCCH) and physical uplink shared channel (PUSCH), or there are overlapped PUCCHs, and there are a plurality of channels corresponding to parameter values, or there are the plurality of channel corresponding to parameter values and the parameter values corresponding to the plurality of channels are different, determining a time value according to any one of following ways:

determining the time value according to parameter values corresponding to each of the plurality of channels;

determining the time value according to parameter values corresponding to part of the plurality of channels; or determining the time value according to part of parameter values corresponding to the plurality of channels, wherein the parameter values are used to determine the time value;

performing a timeline condition adjustment for a first symbol of an earliest channel among the overlapped PUCCH and PUSCH or among the plurality of overlapped PUCCHs based on the time value;

wherein in response to that there are a plurality of channels corresponding to parameter values, or there are the plurality of channel corresponding to parameter values and the parameter values corresponding to the plurality of channels are different, determining the time value includes at least one of the following manners:

manner 1: in response to that there are a plurality of downlink channels for which hybrid automatic repeat request acknowledges (HARQ-ACKS) needs to be transmitted on a same PUCCH, or there are a plurality of downlink channels for which the HARQ-ACKS needs to be transmitted on the same PUCCH and a first set of parameter values corresponding to the plurality of downlink channels are different, determining the first time value according to any one of following ways:

determining the first time according to a first set of parameter values corresponding to each of the plurality of downlink channels;

determining the time value according to the first set of parameter values corresponding to part of the plurality of downlink channels; or determining the time value according to part of the first set of parameter values corresponding to the plurality of downlink channels, wherein the first set of parameter values are used to determine the first time value;

the plurality of downlink channel are physical downlink shared channels (PDSCH) and/or semi-persistent scheduling SPS PDSCH releases;

in response to that the downlink channel is the PDSCH, the first set of parameter values include a first parameter value and/or a second parameter value and/or a third parameter value, and the first parameter value is determined according to a mapping type and/or a transmission duration of the PDSCH, the second parameter value is determined according to whether Downlink Control Information (DCI) scheduling the PDSCH indicates a bandwidth part (BWP) switching, and the third parameter value is determined according to a processing capability of the terminal and a reference subcarrier spacing;

in response to that the downlink channel is the SPS PDSCH release, the first set of parameter values include a fourth parameter value, the fourth parameter value is determined according to a subcarrier spacing of the PDCCH and a processing capability of the terminal, and the subcarrier spacing of the PDCCH is a subcarrier spacing that provides the SPS PDSCH release;

manner 2: in response to that there are a plurality of PUSCHs overlapping with the PUCCH, or there are the plurality of PUSCHs overlapping with the PUCCH and a second set of parameter values corresponding to the plurality of PUSCHs are different, determining a second time value according to any one of following ways:

determining the second time value according to a second set of parameter values corresponding to each of the plurality of PUSCHs, determining the second time value according to the second set of parameter values corresponding to part of the plurality of PUSCHs, or determining the second time value according to part of second set of parameter values corresponding to the plurality of PUSCHs, wherein the second set of parameter values are used to determine the second time value;

wherein the second set of parameter values include a fifth parameter value and/or a sixth parameter value and/or a seventh parameter value; the fifth parameter value is determined based on demodulation reference signal (DMRS) configuration of the PUSCH; the sixth parameter value is determined according to whether the DCI scheduling the PUSCH indicates a BWP switching; the seventh parameter value is determined according to an update set of an aperiodic channel state information (A-CSI) report included in the PUSCH.

2. The uplink channel transmission method according to claim 1, wherein the determining the first time value according to the first set of parameter values corresponding to each of the plurality of downlink channels comprises:

determining the first time value corresponding to each downlink channel according to the first set of parameter values corresponding to each downlink channel;

the performing a timeline condition adjustment for a first symbol of an earliest channel among the overlapped PUCCH and PUSCH or the plurality of overlapped PUCCHs based on the time value comprises:

determining that the first symbol is not before a symbol starting after the first time value corresponding to each downlink channel after a last symbol of the each downlink channel; or wherein determining the first time value according to the first set of parameter values corresponding to part of the plurality of downlink channels comprises:

determining the first time value according to the first set of parameter values corresponding to a first downlink channel among the plurality of downlink channels or a last downlink channel among the plurality of downlink channels or a downlink channel that obtains a maximum first time value;

wherein the downlink channel that obtains the maximum first time value is a downlink channel corresponding to a maximum first parameter value and/or second parameter value and/or third parameter value;

wherein the performing a timeline condition adjustment for a first symbol of an earliest channel among the overlapped PUCCH and PUSCH or among the plurality of overlapped PUCCHs based on the time value comprises:

determining that the first symbol is not before a symbol starting after the first time value after the last symbol of any one of the plurality of downlink channels; or wherein the determining the first time value according to part of the first set of parameter values corresponding to the plurality of downlink channels comprises at least one of the following:

determining the first time value according to a maximum value of first parameter values corresponding to the plurality of downlink channels;

determining the first time value according to a maximum value of second parameter values corresponding to the plurality of downlink channels;

determining the first time value according to a maximum value of third parameter values corresponding to the plurality of downlink channels;

wherein, a first downlink channel corresponding to the maximum value of the first parameter values, a second downlink channel corresponding to the maximum value of the second parameter values, and a third downlink channel corresponding to the maximum value of the third parameter values are the same downlink channel or different downlink channels;

wherein the performing a timeline condition adjustment for a first symbol of an earliest channel among the overlapped PUCCH and PUSCH or among the plurality of overlapped PUCCHs based on the time value comprises:

determining that the first symbol is not before a symbol starting after the first time value after the last symbol of any one of the plurality of downlink channels.

3. The uplink channel transmission method according to claim 1, wherein the determining the second time value according to the second set of parameter values corresponding to each of the plurality of PUSCHs comprises:

determining the second time value corresponding to each PUSCH according to the second set of parameter values corresponding to each PUSCH;

the performing a timeline condition adjustment for a first symbol of an earliest channel among the overlapped PUCCH and PUSCH or among the plurality of overlapped PUCCHs based on the time value comprises:

determining that the first symbol is not before a symbol starting after the second time value corresponding to each PUSCH after a last symbol of any PDCCH in a first PDCCH set, wherein the first PDCCH set includes a PDCCH for scheduling the PDSCH or SPS PDSCH release that requires HARQ-ACKS feedback on the PUCCH, and a PDCCH for scheduling the PUSCH; or wherein the determining the second time value according to the second set of parameter values corresponding to part of the plurality of PUSCHs comprises:

determining the second time value according to the second set of parameter values corresponding to a first PUSCH among the plurality of PUSCHs or a last PUSCH among the plurality of PUSCHs or a PUSCH that obtains the maximum second time value;

wherein the PUSCH that obtains the maximum second time value is a PUSCH corresponding to a maximum fifth parameter value and/or sixth parameter value and/or seventh parameter value;

wherein the performing a timeline condition adjustment for a first symbol of an earliest channel among the overlapped PUCCH and PUSCH or among the plurality of overlapped PUCCHs based on the time value comprises:

determining that the first symbol is not before a symbol starting after the second time value after a last symbol of any PDCCH in a first PDCCH set, wherein the first PDCCH set includes a PDCCH for scheduling the PDSCH or SPS PDSCH release that requires HARQ-ACKS feedback on the PUCCH, and a PDCCH for scheduling the PUSCH;

or wherein the determining the second time value according to part of the second set of parameter values corresponding to the plurality of PUSCHs includes at least one of the following:

determining the second time value according to a maximum value of fifth parameter values respectively corresponding to the plurality of PUSCHs;

determining the second time value according to a maximum value of sixth parameter values respectively corresponding to the plurality of PUSCHs;

determining the second time value according to a maximum value of seventh parameter values respectively corresponding to the plurality of PUSCHs;

wherein a first PUSCH corresponding to the maximum value of the fifth parameter values, a second PUSCH corresponding to the maximum value of the sixth parameter values, and a third PUSCH corresponding to the maximum value of the seventh parameter values are the same PUSCH or different PUSCHs;

wherein the performing a timeline condition adjustment for a first symbol of an earliest channel among the overlapped PUCCH and PUSCH or among the plurality of overlapped PUCCHs based on the time value comprises:

determining that the first symbol is not before a symbol starting after the second time value after a last symbol of any PDCCH in a first PDCCH set, wherein the first PDCCH set includes a PDCCH for scheduling the PDSCH or SPS PDSCH release that requires HARQ-ACKS feedback on the PUCCH, and a PDCCH for scheduling the PUSCH.

4. An uplink channel transmission method, applied to a base station, comprising:

in response to that there are overlapped physical uplink control channel (PUCCH) and physical uplink shared channel (PUSCH), or there are overlapped PUCCHs, and there are a plurality of channels corresponding to parameter values, or there are the plurality of channel corresponding to parameter values and the parameter values corresponding to the plurality of channels are different, determining a time value according to any one of following ways:

determining the time value according to parameter values corresponding to each of the plurality of channels;

determining the time value according to parameter values corresponding to part of the plurality of channels;

determining the time value according to part of parameter values corresponding to the plurality of channels, wherein the parameter values are used to determine the time value; and sending downlink transmission to the terminal, wherein a time condition determined based on the time value is met between the downlink transmission and a first symbol of an earliest channel among the overlapped PUCCH and PUSCH or the overlapped PUCCHs;

wherein in response to that there are a plurality of channels corresponding to parameter values, or there are the plurality of channel corresponding to parameter values and the parameter values corresponding to the plurality of channels are different, determining the time value includes at least one of the following manners:

manner 1: in response to that there are a plurality of downlink channels for which hybrid automatic repeat request acknowledges (HARQ-ACKS) needs to be transmitted on a same PUCCH, or there are a plurality of downlink channels for which the HARQ-ACKS needs to be transmitted on the same PUCCH and the first set of parameter values corresponding to the plurality of downlink channels are different, determining the first time value according to any one of following ways:

determining the first time value according to the first set of parameter values corresponding to each of the plurality of downlink channels;

determining the first time value according to the first set of parameter values corresponding to part of the plurality of downlink channels; or determining the first time value according to part of the first set of parameter values corresponding to the plurality of downlink channels, wherein the first set of parameter values are used to determine the first time value;

the plurality of downlink channel are physical downlink shared channels (PDSCH) and/or semi-persistent scheduling SPS PDSCH releases;

in response to that the downlink channel is the PDSCH, the first set of parameter values include a first parameter value and/or a second parameter value and/or a third parameter value, and the first parameter value is determined according to a mapping type and/or a transmission duration of the PDSCH, the second parameter value is determined according to whether Downlink Control Information (DCI) scheduling the PDSCH indicates a bandwidth part (BWP) switching, and the third parameter value is determined according to a processing capability of the terminal and a reference subcarrier spacing;

in response to that the downlink channel is the SPS PDSCH release, the first set of parameter values include a fourth parameter value, the fourth parameter value is determined according to a subcarrier spacing of the PDCCH and a processing capability of the terminal, and the subcarrier spacing of the PDCCH is a subcarrier spacing that provides the SPS PDSCH release;

manner 2: in response to that there are a plurality of PUSCHs overlapping with the PUCCH, or there are the plurality of PUSCHs overlapping with the PUCCH and a second set of parameter values corresponding to the plurality of PUSCHs are different, determining a second time value according to any one of following ways:

determining the second time value according to second set of parameter values corresponding to each of the plurality of PUSCHs, determining the second time value according to second set of parameter values corresponding to part of the plurality of PUSCHs, or determining the second time value according to part of second set of parameter values corresponding to the plurality of PUSCHs, wherein the second set of the parameter values are used to determine the second time value;

wherein the second set of parameter values include a fifth parameter value and/or a sixth parameter value and/or a seventh parameter value; the fifth parameter value is determined based on demodulation reference signal (DMRS) configuration of the PUSCH; the sixth parameter value is determined according to whether the DCI scheduling the PUSCH indicates a BWP switching; the seventh parameter value is determined according to an update set of an aperiodic channel state information (A-CSI) report included in the PUSCH.

5. The uplink channel transmission method according to claim 4, wherein the determining the first time value according to the first set of parameter values corresponding to each of the plurality of downlink channels comprises:

determining the first time value corresponding to each downlink channel according to the first set of parameter values corresponding to each downlink channel;

the sending downlink transmission to the terminal, wherein a time condition determined based on the time value is met between the downlink transmission and a first symbol of an earliest channel among the overlapped PUCCH and PUSCH or the overlapped PUCCHs includes:

sending a plurality of downlink channels to the terminal, wherein the first symbol is no before a symbol starting after the first time value corresponding to each downlink channel after a last symbol of each downlink channel; or wherein determining the first time value according to the first set of parameter values corresponding to part of the plurality of downlink channels comprises:

determining the first time value according to the first set of parameter values corresponding to a first downlink channel or a last downlink channel among the plurality of downlink channels or a downlink channel that obtains a maximum first time value;

wherein the downlink channel that obtains the maximum first time value is a downlink channel corresponding to a maximum first parameter value and/or second parameter value and/or third parameter value;

wherein the sending downlink transmission to the terminal, wherein a time condition determined based on the time value is met between the downlink transmission and a first symbol of an earliest channel among the overlapped PUCCH and PUSCH or the overlapped PUCCHs includes:

sending the plurality of downlink channels to the terminal, wherein the first symbol is not before a symbol starting after the first time value after the last symbol of any one of the plurality of downlink channels;

or wherein the determining the first time value according to part of the first set of parameter values corresponding to the plurality of downlink channels comprises at least one of the following:

determining the first time value according to a maximum value of first parameter values corresponding to the plurality of downlink channels;

determining the first time value according to a maximum value of second parameter values corresponding to the plurality of downlink channels;

determining the first time value according to a maximum value of third parameter values corresponding to the plurality of downlink channels;

wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels;

wherein the sending downlink transmission to the terminal, wherein a time condition determined based on the time value is met between the downlink transmission and a first symbol of an earliest channel among the overlapped PUCCH and PUSCH or the overlapped PUCCHs includes:

sending the plurality of downlink channels to the terminal, wherein the first symbol is not before a symbol starting after the first time value after the last symbol of any one of the plurality of downlink channels.

6. The uplink channel transmission method according to claim 4, wherein the determining the second time value according to the second set of parameter values corresponding to each of the plurality of PUSCHs comprises:

determining the second time value corresponding to each PUSCH according to the second set of parameter values corresponding to each PUSCH;

the sending downlink transmission to the terminal, wherein a time condition determined based on the time value is met between the downlink transmission and a first symbol of an earliest channel among the overlapped PUCCH and PUSCH or the overlapped PUCCHs includes:

sending each PDCCH in the first PDCCH set to the terminal, wherein the first symbol is not before a symbol starting after the second time value corresponding to each PUSCH after the last symbol of any PDCCH in the first PDCCH set, wherein the first PDCCH set includes the PDCCH for scheduling the PDSCH or SPS PDSCH release that requires HARQ-ACKS feedback on the PUCCH, or a PDCCH for scheduling the PUSCH; or wherein the determining the second time value according to the second set of parameter values corresponding to part of the plurality of PUSCHs comprises:

determining the second time value according to the second set of parameter values corresponding to a first PUSCH or a last PUSCH among the plurality of PUSCHs or a PUSCH that obtains the maximum second time value;

wherein the PUSCH that obtains the maximum second time value is a PUSCH corresponding to a maximum fifth parameter value and/or sixth parameter value and/or seventh parameter value;

wherein the sending downlink transmission to the terminal, wherein a time condition determined based on the time value is met between the downlink transmission and a first symbol of an earliest channel among the overlapped PUCCH and PUSCH or the overlapped PUCCHs includes:

sending each PDCCH in the first PDCCH set to the terminal, wherein the first symbol is no before a symbol starting after the second time value after the last symbol of any PDCCH in the first PDCCH set, wherein the first PDCCH set includes the PDCCH for scheduling the PDSCH or SPS PDCSH release that requires HARQ-ACKS feedback on the PUCCH, and a PDCCH for scheduling the PUSCH; or wherein the determining the second time value according to part of the second set of parameter values corresponding to the plurality of PUSCHs includes at least one of the following:

determining the second time value according to a maximum value of fifth parameter values respectively corresponding to the plurality of PUSCHs;

determining the second time value according to a maximum value of sixth parameter values respectively corresponding to the plurality of PUSCHs;

determining the second time value according to a maximum value of seventh parameter values respectively corresponding to the plurality of PUSCHs;

wherein the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs;

wherein the sending downlink transmission to the terminal, wherein a time condition determined based on the time value is met between the downlink transmission and a first symbol of an earliest channel among the overlapped PUCCH and PUSCH or the overlapped PUCCHs includes:

sending each PDCCH in the first PDCCH set to the terminal, wherein the first symbol is no before a symbol starting after the second time value after the last symbol of any PDCCH in the first PDCCH set, wherein the first PDCCH set includes the PDCCH for scheduling the PDSCH or SPS PDCSH release that requires HARQ-ACKS feedback on the PUCCH, and a PDCCH for scheduling the PUSCH.

7. A terminal includes: a transceiver, a memory, a processor, and a program stored in the memory and executed by the processor, wherein the processor executes the program to implements the following steps:

in response to that there are overlapped physical uplink control channel (PUCCH) and physical uplink shared channel (PUSCH), or there are overlapped PUCCHs, and there are a plurality of channels corresponding to parameter values, or if there are the plurality of channel corresponding to parameter values and the parameter values corresponding to the plurality of channels are different, determining a time value according to any one of following ways:

determining the time value according to parameter values corresponding to each of the plurality of channels;

determining the time value according to parameter values corresponding to part of the plurality of channels; or determining the time value according to part of parameter values corresponding to the plurality of channels, wherein the parameter values are used to determine the time value;

performing a timeline condition adjustment for a first symbol of an earliest channel among the overlapped PUCCH and PUSCH or the plurality of overlapped PUCCHs based on the time value;

wherein the processor executes the program to implement at least one of the following manners:

manner 1: in response to that there are a plurality of downlink channels for which hybrid automatic repeat request acknowledges (HARQ-ACKS) needs to be transmitted on a same PUCCH, or there are a plurality of downlink channels for which the HARQ-ACKS needs to be transmitted on the same PUCCH and the first set of parameter values corresponding to the plurality of downlink channels are different, determining the first time value according to any one of following ways:

determining the first time value according to the first set of parameter values corresponding to each of the plurality of downlink channels;

determining the first time value according to the first set of parameter values corresponding to part of the plurality of downlink channels; or determining the first time value according to part of the first set of parameter values corresponding to the plurality of downlink channels, wherein the first set of parameter values are used to determine the first time value;

the plurality of downlink channel are physical downlink shared channels (PDSCH) and/or semi-persistent scheduling (SPS) PDSCH releases;

in response to that the downlink channel is the PDSCH, the first set of parameter values include a first parameter value and/or a second parameter value and/or a third parameter value, and the first parameter value is determined according to a mapping type and/or a transmission duration of the PDSCH, the second parameter value is determined according to whether Downlink Control Information (DCI) scheduling the PDSCH indicates a bandwidth part (BWP) switching, and the third parameter value is determined according to a processing capability of the terminal and a reference subcarrier spacing;

in response to that the downlink channel is the SPS PDSCH release, the first set of parameter values include a fourth parameter value, and the fourth parameter value is determined according to a subcarrier spacing of the PDCCH and a processing capability of the terminal, and the subcarrier spacing of the PDCCH is a subcarrier spacing that provides the SPS PDSCH release;

manner 2: in response to that there are a plurality of PUSCHs overlapping with the PUCCH, or there are the plurality of PUSCHs overlapping with the PUCCH and a second set of parameter values corresponding to the plurality of PUSCHs are different, determining a second time value according to any one of following ways:
determining the second time value according to second set of parameter values corresponding to each of the plurality of PUSCHs,
determining the second time value according to second set of parameter values corresponding to part of the plurality of PUSCHs, or
determining the second time value according to part of second set of parameter values corresponding to the plurality of PUSCHs,
wherein the second set of parameter values are used to determine the second time value;
wherein the second set of parameter values include a fifth parameter value and/or a sixth parameter value and/or a seventh parameter value; the fifth parameter value is determined based on demodulation reference signal (DMRS) configuration of the PUSCH; the sixth parameter value is determined according to whether the DCI scheduling the PUSCH indicates a BWP switching; the seventh parameter value is determined according to an update set of an aperiodic channel state information (A-CSI) report included in the PUSCH.

8. The terminal according to claim 7, wherein the processor executes the program to implements the following steps:
determining the first time value corresponding to each downlink channel according to the first set of parameter values corresponding to each downlink channel;
the performing a timeline condition adjustment for a first symbol of an earliest channel among the overlapped PUCCH and PUSCH or the plurality of overlapped PUCCHs based on the time value comprises:
determining that the first symbol is not before a symbol starting after the first time value corresponding to each downlink channel after a last symbol of each downlink channel; or
wherein the processor executes the program to implements the following steps:
determining the first time value according to the first set of parameter values corresponding to a first downlink channel or a last downlink channel among the plurality of downlink channels or a downlink channel that obtains a maximum first time value;
wherein the downlink channel that obtains the maximum first time value is a downlink channel corresponding to a maximum first parameter value and/or second parameter value and/or third parameter value;
wherein the processor executes the program to implements the following steps:
determining that the first symbol is not before a symbol starting after the first time value after the last symbol of any one of the plurality of downlink channels;
or
wherein the processor executes the program to implements the following steps:
determining the first time value according to a maximum value of first parameter values corresponding to the plurality of downlink channels;
determining the first time value according to a maximum value of second parameter values corresponding to the plurality of downlink channels;
determining the first time value according to a maximum value of third parameter values corresponding to the plurality of downlink channels;
wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels,
wherein the processor executes the program to implements the following steps:
determining that the first symbol is not before a symbol starting after the first time value after the last symbol of any one of the plurality of downlink channels.

9. The terminal according to claim 7, wherein the processor executes the program to implements the following steps:
determining the second time value corresponding to each PUSCH according to the second set of parameter values corresponding to each PUSCH;
the performing a timeline condition adjustment for a first symbol of an earliest channel among the overlapped PUCCH and PUSCH or the plurality of overlapped PUCCHs based on the time value comprises:
determining that the first symbol is not before a symbol starting after the second time value after a last symbol of any PDCCH in a first PDCCH set, wherein the first PDCCH set includes the PDCCH for scheduling the PDSCH or SPS PDSCH release that requires HARQ-ACKS feedback on the PUCCH, and the PDCCH for scheduling the PUSCH; or
wherein the processor executes the program to implements the following steps:
determining the second time value according to the second set of parameter values corresponding to a first PUSCH or a last PUSCH among the plurality of PUSCHs or a PUSCH that obtains the maximum second time value;
wherein the PUSCH that obtains the maximum second time value is a PUSCH corresponding to a maximum fifth parameter value and/or sixth parameter value and/or seventh parameter value;
the processor executes the program to implements the following steps:
determining that the first symbol is not before a symbol starting after the second time value after a last symbol of any PDCCH in a first PDCCH set, wherein the first PDCCH set includes a PDCCH for scheduling the PDSCH or SPS PDSCH release that requires HARQ-ACKS feedback on the PUCCH, and the PDCCH for scheduling the PUSCH;
or
wherein the processor executes the program to implements the following steps:
determining the second time value according to a maximum value of fifth parameter values respectively corresponding to the plurality of PUSCHs;
determining the second time value according to a maximum value of sixth parameter values respectively corresponding to the plurality of PUSCHs;
determining the second time value according to a maximum value of seventh parameter values respectively corresponding to the plurality of PUSCHs;
wherein the first PUSCH corresponding to the maximum value of the fifth parameter values, the second PUSCH corresponding to the maximum value of the sixth parameter values, and the third PUSCH corresponding to the maximum value of the seventh parameter values are the same PUSCH or different PUSCHs,
wherein the processor executes the program to implements the following steps:
determining that the first symbol is not before a symbol starting after the second time value after a last symbol of any PDCCH in a first PDCCH set, wherein the first PDCCH set includes a PDCCH for scheduling the PDSCH or SPS PDSCH release that requires HARQ-ACKS feedback on the PUCCH, and the PDCCH for scheduling the PUSCH.

10. A base station includes: a transceiver, a memory, a processor, and a program stored on the memory and executed by the processor, wherein the processor executes the program to implement uplink channel transmission method according to claim 4.

11. The base station according to claim 10, wherein the processor executes the program to implements the following steps:
determining the first time value corresponding to each downlink channel according to the first set of parameter values corresponding to each downlink channel;
the sending downlink transmission to the terminal, wherein a time condition determined based on the time value is met between the downlink transmission and a first symbol of an earliest channel among the overlapped PUCCH and PUSCH or the overlapped PUCCHs includes:
sending a plurality of downlink channels to the terminal, wherein the first symbol is no before a symbol starting after the first time value corresponding to each downlink channel after a last symbol of each downlink channel; or
wherein the processor executes the program to implements the following steps:
determining the first time value according to the first set of parameter values corresponding to a first downlink channel or a last downlink channel among the plurality of downlink channels or a downlink channel that obtains a maximum first time value;
wherein the downlink channel that obtains the maximum first time value is a downlink channel corresponding to a maximum first parameter value and/or second parameter value and/or third parameter value;
wherein the processor executes the program to implements the following steps:
sending the plurality of downlink channels to the terminal, wherein the first symbol is not before a symbol starting after the first time value after the last symbol of any one of the plurality of downlink channels;
or
wherein the processor executes the program to implements the following steps:
determining the first time value according to a maximum value of first parameter values corresponding to the plurality of downlink channels;
determining the first time value according to a maximum value of second parameter values corresponding to the plurality of downlink channels;
determining the first time value according to a maximum value of third parameter values corresponding to the plurality of downlink channels;
wherein, the first downlink channel corresponding to the maximum value of the first parameter values, the second downlink channel corresponding to the maximum value of the second parameter values, and the third downlink channel corresponding to the maximum value of the third parameter values are the same downlink channel or different downlink channels,
wherein the processor executes the program to implements the following steps:
sending the plurality of downlink channels to the terminal, wherein the first symbol is not before a symbol starting after the first time value after the last symbol of any one of the plurality of downlink channels.

12. The base station according to claim 10, wherein the processor executes the program to implements the following steps:
determining the second time value corresponding to each PUSCH according to the second set of parameter values corresponding to each PUSCH;
the sending downlink transmission to the terminal, wherein a time condition determined based on the time value is met between the downlink transmission and a first symbol of an earliest channel among the overlapped PUCCH and PUSCH or the overlapped PUCCHs includes:
sending each PDCCH in the first PDCCH set to the terminal, wherein the first symbol is not before a symbol starting after the second time value corresponding to each PUSCH after the last symbol of any PDCCH in the first PDCCH set, wherein the first PDCCH set includes the PDCCH for scheduling the PDSCH or SPS PDSCH release that requires HARQ-ACKS feedback on the PUCCH, or a PDCCH for scheduling the PUSCH; or
wherein the processor executes the program to implements the following steps:
determining the second time value according to the second set of parameter values corresponding to a first PUSCH or a last PUSCH among the plurality of PUSCHs or a PUSCH that obtains the maximum second time value;
wherein the PUSCH that obtains the maximum second time value is a PUSCH corresponding to a maximum fifth parameter value and/or sixth parameter value and/or seventh parameter value,
wherein the processor executes the program to implements the following steps:
sending each PDCCH in the first PDCCH set to the terminal, wherein the first symbol is no before a symbol starting after the second time value after the last symbol of any PDCCH in the first PDCCH set, wherein the first PDCCH set includes the PDCCH for scheduling the PDSCH or SPS PDCSH release that requires HARQ-ACKS feedback on the PUCCH, and a PDCCH for scheduling the PUSCH;

or wherein the processor executes the program to implements the following steps:

sending each PDCCH in the first PDCCH set to the terminal, wherein the first symbol is no before a symbol starting after the second time value after the last symbol of any PDCCH in the first PDCCH set, wherein the first PDCCH set includes the PDCCH for scheduling the PDSCH or SPS PDCSH release that requires HARQ-ACKS feedback on the PUCCH, and a PDCCH for scheduling the PUSCH.

\* \* \* \* \*